United States Patent
Savatsky et al.

(10) Patent No.: US 11,117,991 B2
(45) Date of Patent: Sep. 14, 2021

(54) METHODS FOR OPERATING A POLYMERIZATION REACTOR

(71) Applicant: Univation Technologies, LLC, Houston, TX (US)

(72) Inventors: Bruce J. Savatsky, Kingwood, TX (US); R. Eric Pequeno, Baytown, TX (US); Brandon C. Locklear, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 150 days.

(21) Appl. No.: 16/531,453

(22) Filed: Aug. 5, 2019

(65) Prior Publication Data

US 2019/0352440 A1     Nov. 21, 2019

Related U.S. Application Data

(63) Continuation of application No. 15/568,912, filed as application No. PCT/US2016/028966 on Apr. 22, 2016, now Pat. No. 10,400,049.

(60) Provisional application No. 62/152,513, filed on Apr. 24, 2015.

(51) Int. Cl.

| C08F 2/00 | (2006.01) |
| C08F 4/659 | (2006.01) |
| C08F 4/6592 | (2006.01) |
| C08F 210/16 | (2006.01) |
| C08L 23/08 | (2006.01) |

(52) U.S. Cl.
CPC ........ C08F 210/16 (2013.01); C08L 23/0815 (2013.01); *C08F 4/659* (2013.01); *C08F 4/65925* (2013.01); *C08F 2410/01* (2013.01)

(58) Field of Classification Search
CPC ......... C08F 2/001; C08F 5/659; C08F 4/6592
See application file for complete search history.

(56) References Cited

U.S. PATENT DOCUMENTS

| 4,390,669 A | 6/1983 | Yoshinori et al. |
| 5,283,278 A | 2/1994 | Daire et al. |
| 5,753,786 A | 5/1998 | Agapiou et al. |
| 6,284,849 B1 | 9/2001 | Almquist et al. |
| 6,552,150 B1 | 4/2003 | Nummila-Pakarinen et al. |
| 6,838,532 B2 | 1/2005 | Veariel et al. |
| 7,847,036 B2 | 12/2010 | Savatsky et al. |
| 8,349,975 B2 | 1/2013 | Chamayou |
| 8,420,733 B2 | 4/2013 | Stakem et al. |
| 9,234,061 B2 | 1/2016 | Vahteri et al. |
| 2003/0171513 A1 | 9/2003 | Mawson et al. |
| 2009/0306323 A1* | 12/2009 | Kolb ............... C07F 7/003 526/348.4 |
| 2011/0262671 A1 | 10/2011 | Pakkanen et al. |
| 2013/0253153 A1 | 9/2013 | Pequeno et al. |
| 2014/0121325 A1 | 5/2014 | Holtcamp et al. |
| 2015/0051364 A1 | 2/2015 | Vahteri et al. |
| 2015/0361186 A1 | 12/2015 | Fouarge et al. |

FOREIGN PATENT DOCUMENTS

| CN | 1902234 | 1/2007 |
| EP | 1961777 | 8/2008 |
| WO | 0058377 | 10/2000 |

OTHER PUBLICATIONS

International Search Report & Written Opinion for related PCT Application PCT/US2016/028966, dated Jul. 13, 2016 (10 pgs).
International Preliminary Report on Patentability for related PCT Application PCT/US2016/028966, dated Nov. 2, 2017 (7 pgs).

* cited by examiner

*Primary Examiner* — Caixia Lu
(74) *Attorney, Agent, or Firm* — Brooks, Cameron & Huebsch, PLLC

(57) ABSTRACT

Methods for olefin polymerization are described. The methods include a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; and b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; wherein the process is essentially free of providing a polymerization neutralizing composition between steps a) and b).

10 Claims, 2 Drawing Sheets

METHODS FOR OPERATING A POLYMERIZATION REACTOR

PRIORITY INFORMATION

This application is a Continuation of U.S. § 371 National Stage application Ser. No. 15/568,912, filed Oct. 24, 2017 and published as U.S. Publication No. 2018/0118862 A1 on May 3, 2018, which claims the benefit of International Application Number PCT/US2016/028966, filed Apr. 22, 2016 and published as WO 2016/172567 on Oct. 27, 2016, which claims the benefit to U.S. Provisional Application 62/152,513, filed Apr. 24, 2015, the entire contents of which are incorporated herein by reference in its entirety.

FIELD OF THE INVENTION

This disclosure relates to methods for olefin polymerization in a gas phase polymerization reactor.

BACKGROUND

In gas phase polymerization processes, a gaseous stream containing one or more monomers is passed through a fluidized bed under reactive conditions in the presence of a catalyst. A polymer product is withdrawn from the reactor, while fresh monomer is introduced to the reactor to react with the catalyst and replace the removed polymer product. A gas phase fluidized bed reactor can include a reaction zone and a so-called velocity reduction zone. The reaction zone can include a bed of growing polymer particles, formed polymer particles, and a minor amount of catalyst particles fluidized by the continuous flow of gaseous monomer and diluent to remove heat of polymerization through the reaction zone. A portion of the gases within the reactor can be re-circulated via a cycle gas stream. This cycle gas stream can be passed through a heat exchanger, where at least a portion of the heat of polymerization can be removed, and then compressed in a compressor and returned to the reaction zone.

While the manufacture of a particular polymer product may be fairly well understood, the transition from the manufacture of one polymer product to another in an efficient manner may still be problematic. For example, process conditions that favor the efficient production of one polymer product may not be conducive to the formation of a different product. Different polymer products often require not only the use of different conditions, but also the use of different catalysts. Moreover, disparities in the characteristics of the polymer products themselves can add to the difficulties in efficient transitioning. Thus, the development of processes and procedures for efficiently transitioning from the manufacture of one polymer product to another continues to be an area of research.

One method of improving the efficiency of such transitions includes the addition of a polymerization neutralizing agent (sometimes referred to as a "kill agent") to the polymerization. Typical kill procedures require the reactor to be opened, purged of hydrocarbons, emptied of polymer and catalyst particles, cleaned, and reloaded with the removed bed or a new bed to provide a "seedbed" of polymer. This process is time consuming, expensive, and allows impurities, such as moisture and air, to enter the reactor. Such impurities necessitate another time consuming procedure to remove, which typically involves a nitrogen purge to reduce the impurity levels to less than 10 ppm, before restarting the reactor.

It has been recognized that polymerization reactors may be vulnerable to sheeting and/or fouling during the critical initial stage(s) of a polymerization reaction (before the reaction has stabilized) even if each such initial stage is performed in the presence of a continuity additive (CA). Typically, the concentration of CA in a reactor is too low to eliminate this vulnerability if the CA is introduced during the initial stage(s) of the polymerization reaction. Thus in another method, a continuity additive is pre-loaded into the polymerization reactor or a mixture of a CA and a seed bed are pre-loaded into the reactor. This is sometimes referred to as "quick seedbed replacement."

Nevertheless, efficient methods for transitioning between the production of desired polymer products remain a need, particularly where different catalysts are used to prepare the desired products.

SUMMARY

The subject matter described herein relates, in part, to the realization that the transition from the manufacture of a first polymer product using a first catalyst composition to a second polymer product using a second catalyst composition can be achieved in surprisingly small number of bed turnovers using the same catalyst bed and without the need for ending the first polymerization with a polymerization neutralizing agent.

Thus, methods described herein are directed to olefin polymerization, the methods comprising: a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; and b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; with the proviso that the process is essentially free of providing a polymerization neutralizing composition between steps a) and b).

Methods described herein are also directed to olefin polymerization, the methods comprising: a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; and b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; with the proviso that the process is essentially free of providing a polymerization neutralizing composition between steps a) and b); wherein the difference between the target densities of the first and second polyolefin compositions is ≤0.005 g/cm³, the difference in the target flow indexes of the first and second polyolefin compositions is ≥about 10.0 g/10 min., and the target density, $\rho_2$, and the target Flow Index, $FI_2$, are reached after a first transition period comprising ≤5.0 bed turnovers.

The methods may further include: c) forming a third polyolefin composition under a third set of polymerization conditions in the presence of the first catalyst composition and a third concentration of a third continuity additive, the third polyolefin composition having a target density, $\rho_3$, and target Flow Index, $FI_3$. The first and third catalysts, the first and third sets of polymerization conditions, and the first and third polyolefin products may be the same.

DETAILED DESCRIPTION

Figure 1:
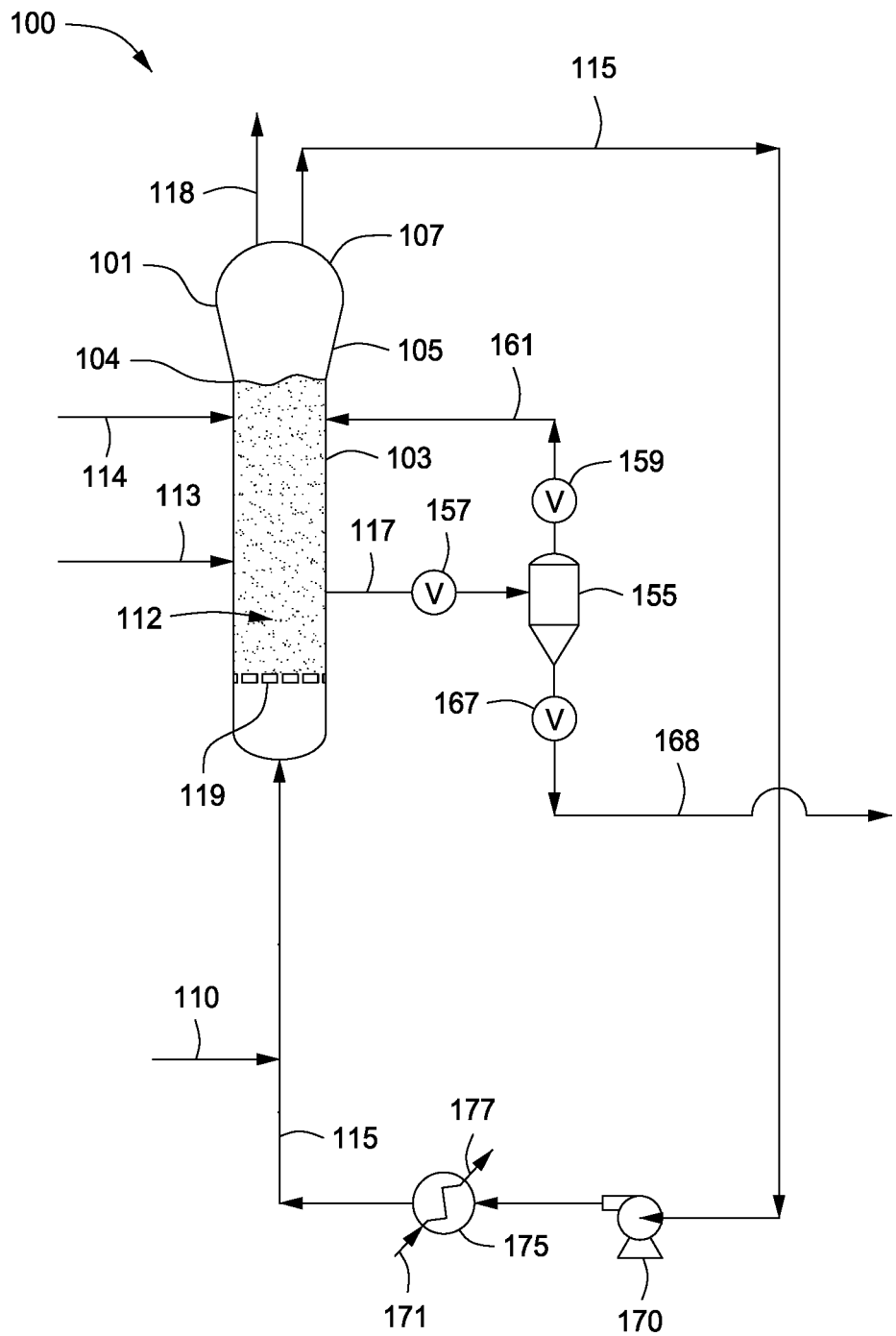
FIG. 1 depicts a schematic of an exemplary gas phase polymerization system for making polyolefins described herein.

In the following description, numerous details are set forth to provide an understanding of the present disclosure. However, it will be understood by those skilled in the art that the present disclosure may be practiced without these details and that numerous variations or modifications from the described embodiments are possible.

For the purposes of subject matter described herein and the claims thereto, the new numbering scheme for the Periodic Table Groups is used as described in Chemical and Engineering News, 63(5), pg. 27 (1985). Therefore, a "Group 4 metal" is an element from Group 4 of the Periodic Table, e.g., Ti, Zr, or Hf.

As used herein, the term "substituted" means that the referenced group possesses at least one moiety in place of one or more hydrogens in any position, the moieties selected from such groups as halogen radicals (esp., F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

As used herein when referring to a target densities, the term "essentially the same" means that the two densities do not differ by more than 0.001 g/cm³.

As used herein when referring to a target Flow Indices, the term "essentially the same" means that the two Flow Indices do not differ by more than 2.0 g/10 min, by more than 1.0 g/10 min, by more than 0.5 g/10 min, by more than 0.25 g/10 min, or by more than 0.10 g/10 min.

As used herein with particular compounds or compositions, the term "essentially the same" means that no effort is purposefully made to make the compounds or compositions differ and/or that the two compounds or compositions differ only with respect to commercially reasonable or acceptable amounts of impurities (i.e. the two compounds or compositions still meet the same grade specification).

As used herein the phrase "essentially free of providing a polymerization neutralizing composition" and the like means that a polymerization neutralizing composition is not affirmatively added to the reactor during a period between the use of two different catalyst compositions or that a polymerization neutralizing composition is not added to the reactor during a period between the use of two different catalyst compositions in an amount sufficient to appreciably reduce the activity of the first catalyst, e.g. it is added at less than about 1 part per million by volume ("ppmv"), about 5 ppmv, about 10 ppmv, about 30 ppmv, about 50 ppmv, about 100 ppmv, about 250 ppmw, or about 500 ppmv, for example. Polymerization neutralizers typically may include, but are not limited to, one or more Lewis bases such as carbon monoxide, carbon dioxide, water, or any combination thereof. Other polymerization neutralizers are known in the art.

As used herein the term "Bed Turnovers" is defined as the total time a reactor operates divided by the residence time. Thus, is a reactor operates for 25 hours at a residence time of 10 hours, 2.5 bed turnovers would have occurred. Residence time is defined as the bed weight divided by the production rate. Bed turnovers are counted from the time a desired production rate is achieved, e.g., 50 lb/hr, or 150 lbs/hr.

Polymerization Conditions

The first, second. And optional third, set of polymerization conditions may be selected from any of the conditions described below.

FIG. 1 depicts a flow diagram of an illustrative gas phase polymerization system 100 for making polymers, according to one or more embodiments. The polymerization system 100 can include a reactor 101 in fluid communication with one or more discharge tanks 155 (only one shown), compressors 170 (only one shown), and heat exchangers 175 (only one shown). The polymerization system 100 can also include more than one reactor 101 arranged in series, parallel, or configured independent from the other reactors, each reactor having its own associated discharge tanks 155, compressors 170, and heat exchangers 175, or alternatively, sharing any one or more of the associated discharge tanks 155, compressors 170, and heat exchangers 175. For simplicity and ease of description, the polymerization system 100 will be further described in the context of a single reactor train.

The reactor 101 can include a cylindrical section 103, a transition section 105, and a velocity reduction zone or dome 107. The cylindrical section 103 is disposed adjacent the transition section 105. The transition section 105 can expand from a first diameter that corresponds to the diameter of the cylindrical section 103 to a larger diameter adjacent the dome 107. As mentioned above, the location or junction at which the cylindrical section 103 connects to the transition section 105 is referred to as the "neck" or the "reactor neck" 104. The dome 107 has a bulbous shape. One or more cycle fluid lines 115 and vent lines 118 can be in fluid communication with the top head 107. The reactor 101 can include the fluidized bed 112 in fluid communication with the top head 107.

In general, the height to diameter ratio of the cylindrical section 103 can vary in the range of from about 2:1 to about 5:1. The range, of course, can vary to larger or smaller ratios and depends, at least in part, upon the desired production capacity and/or reactor dimensions. The cross-sectional area of the dome 107 is typically within the range of from about 2 to about 3 multiplied by the cross-sectional area of the cylindrical section 103.

The velocity reduction zone or dome 107 has a larger inner diameter than the fluidized bed 112. As the name suggests, the velocity reduction zone 107 slows the velocity of the gas due to the increased cross-sectional area. This reduction in gas velocity allows particles entrained in the upward moving gas to fall back into the bed, allowing primarily only gas to exit overhead of the reactor 101 through the cycle fluid line 115. The cycle fluid recovered via line 115 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of the particles entrained in fluidized bed 112.

The reactor feed via line 110 can be introduced to the polymerization system 100 at any point. For example, the reactor feed via line 110 can be introduced to the cylindrical section 103, the transition section 105, the velocity reduction zone 107, to any point within the cycle fluid line 115, or any combination thereof. Preferably, the reactor feed 110 is introduced to the cycle fluid in line 115 before or after the heat exchanger 175. In FIG. 1, the reactor feed via line 110 is depicted entering the cycle fluid in line 115 after the heat exchanger 175. The catalyst feed via line 113 can be introduced to the polymerization system 100 at any point. Preferably the catalyst feed via line 113 is introduced to the fluidized bed 112 within the cylindrical section 103.

The cycle fluid via line 115 can be compressed in the compressor 170 and then passed through the heat exchanger 175 where heat can be exchanged between the cycle fluid and a heat transfer medium. For example, during normal operating conditions a cool or cold heat transfer medium via line 171 can be introduced to the heat exchanger 175 where heat can be transferred from the cycle fluid in line 115 to produce a heated heat transfer medium via line 177 and a cooled cycle fluid via line 115. In another example, during idling of the reactor 101 a warm or hot heat transfer medium via line 171 can be introduced to the heat exchanger 175 where heat can be transferred from the heat transfer medium to the cycle fluid in line 115 to produce a cooled heat transfer medium via line 177 and a heated cycle fluid via line 115. The terms "cool heat transfer medium" and "cold heat transfer medium" refer to a heat transfer medium having a temperature less than the fluidized bed 112 within the reactor 101. The terms "warm heat transfer medium" and "hot heat transfer medium" refer to a heat transfer medium having a temperature greater than the fluidized bed 112 within the reactor 101. The heat exchanger 175 can be used to cool the fluidized bed 112 or heat the fluidized bed 112 depending on the particular operating conditions of the polymerization system 100, e.g. start-up, normal operation, idling, and shut down. Illustrative heat transfer mediums can include, but are not limited to, water, air, glycols, or the like. It is also possible to locate the compressor 170 downstream from the heat exchanger 175 or at an intermediate point between several heat exchangers 175.

After cooling, all or a portion of the cycle fluid via line 115 can be returned to the reactor 101. The cooled cycle fluid in line 115 can absorb the heat of reaction generated by the polymerization reaction. The heat transfer medium in line 171 can be used to transfer heat to the cycle fluid in line 115 thereby introducing heat to the polymerization system 100 rather than removing heat therefrom. The heat exchanger 175 can be of any type of heat exchanger. Illustrative heat exchangers can include, but are not limited to, shell and tube, plate and frame, U-tube, and the like. For example, the heat exchanger 175 can be a shell and tube heat exchanger where the cycle fluid via line 115 can be introduced to the tube side and the heat transfer medium can be introduced to the shell side of the heat exchanger 175. If desired, several heat exchangers can be employed, in series, parallel, or a combination of series and parallel, to lower or increase the temperature of the cycle fluid in stages.

Preferably, the cycle gas via line 115 is returned to the reactor 101 and to the fluidized bed 112 through fluid distributor plate ("plate") 119. The plate 119 is preferably installed at the inlet to the reactor 101 to prevent polymer particles from settling out and agglomerating into a solid mass and to prevent liquid accumulation at the bottom of the reactor 101 as well to facilitate easy transitions between processes which contain liquid in the cycle stream 115 and those which do not and vice versa. Although not shown, the cycle gas via line 115 can be introduced into the reactor 101 through a deflector disposed or located intermediate an end of the reactor 101 and the distributor plate 119.

The catalyst feed via line 113 can be introduced to the fluidized bed 112 within the reactor 101 through one or more injection nozzles (not shown) in fluid communication with line 113. The catalyst feed may be introduced as pre-formed particles in one or more liquid carriers (i.e. a catalyst slurry). Suitable liquid carriers can include mineral oil and/or liquid or gaseous hydrocarbons including, but not limited to, propane, butane, isopentane, hexane, heptane octane, or mixtures thereof. A gas that is inert to the catalyst slurry such as, for example, nitrogen or argon can also be used to carry the catalyst slurry into the reactor 101. In one example, the catalyst can be a dry powder. In another example, the catalyst can be dissolved in a liquid carrier and introduced to the reactor 101 as a solution. The catalyst via line 113 can be introduced to the reactor 101 at a rate sufficient to maintain polymerization of the monomer(s) therein.

Fluid via line 161 can be separated from a polymer product recovered via line 117 from the reactor 101. The fluid can include unreacted monomer(s), hydrogen, induced condensing agent(s) ("ICA(s)"), and/or inerts. The separated fluid can be introduced to the reactor 101. The separated fluid can be introduced to the recycle line 115 (not shown). The separation of the fluid can be accomplished when fluid and product leave the reactor 101 and enter the product discharge tanks 155 (one is shown) through valve 157, which can be, for example, a ball valve designed to have minimum restriction to flow when opened. Positioned above and below the product discharge tank 155 can be conventional valves 159, 167. The valve 167 allows passage of product therethrough. For example, to discharge the polymer product from the reactor 101, valve 157 can be opened while valves 159, 167 are in a closed position. Product and fluid enter the product discharge tank 155. Valve 157 is closed and the product is allowed to settle in the product discharge tank 155. Valve 159 is then opened permitting fluid to flow via line 161 from the product discharge tank 155 to the reactor 101. Valve 159 can then be closed and valve 167 can be opened and any product in the product discharge tank 155 can flow into and be recovered via line 168. Valve 167 can then be closed. Although not shown, the product via line 168 can be introduced to a plurality of purge bins or separation units, in series, parallel, or a combination of series and parallel, to further separate gases and/or liquids from the product. The particular timing sequence of the valves 157, 159, 167, can be accomplished by use of conventional programmable controllers which are well known in the art.

Another preferred product discharge system which can be alternatively employed is that disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The reactor 101 can be equipped with one or more vent lines 118 to allow venting the bed during start up, idling, and/or shut down. The reactor 101 can be free from the use of stirring and/or wall scraping. The cycle line 115 and the elements therein (compressor 170, heat exchanger 175) can be smooth surfaced and devoid of unnecessary obstructions so as not to impede the flow of cycle fluid or entrained particles.

The conditions for polymerizations vary depending upon the monomers, catalysts, catalyst systems, and equipment availability. The specific conditions are known or readily derivable by those skilled in the art. For example, the temperatures can be within the range of from about −10° C. to about 140° C., often about 15° C. to about 120° C., and more often about 70° C. to about 110° C. Pressures can be within the range of from about 10 kPag to about 10,000 kPag, such as about 500 kPag to about 5,000 kPag, or about 1,000 kPag to about 2,200 kPag, for example.

The amount of hydrogen in the reactor 101 can be expressed as a mole ratio relative to the total polymerizable monomer, for example, ethylene or a blend of ethylene and one or more comonomers. The amount of hydrogen used in the polymerization process can be an amount necessary to achieve the desired flow index of the final polyolefin resin. The mole ratio of hydrogen to total monomer ($H_2$:monomer) can be ≥about 0.0001, e.g., ≥about 0.0005, ≥about 0.001, ≥about 0.01, ≥about 0.1, ≥about 1.0, ≥about 3.0, or about 5.0. Additionally or alternatively, the mole ratio of hydrogen to total monomer ($H_2$:monomer) can be ≤about 10, e.g., ≤about 5.0, ≤about 3.0, ≤about 1.0, ≤about 0.1, ≤about 0.01, ≤about 0.001, or ≤about 0.0005. Ranges of the concentration of the continuity aid that are expressly disclosed comprise ranges formed by pairs of any of the above-enumerated values, e.g., about 0.0001 to about 10.0, about 0.0005 to about 5.0, about 0.0005 to 0.001, about 0.001 to about 3.0, about 0.01 to about 1.0, etc. Expressed another way, the amount of hydrogen in the reactor at any time can range to up to 5,000 ppm, or up to 4,000 ppm, or up to 3,000 ppm, or between 50 ppm and 5,000 ppm, or between 50 ppm and 2,000 ppm. The amount of hydrogen in the reactor can range from a low of about 1 ppm, about 50 ppm, or about 100 ppm to a high of about 400 ppm, about 800 ppm, about 1,000 ppm, about 1,500 ppm, about 2,000 ppm, about 5,000 ppm, or about 10,000 ppm, with suitable ranges comprising the combination of any two values. The ratio of hydrogen to total monomer ($H_2$:monomer) can be about 0.00001:1 to about 2:1, about 0.005:1 to about 1.5:1, or about 0.0001:1 to about 1:1.

Other illustrative techniques that can also be used to reduce or eliminate fouling and/or sheeting can include the introduction of finely divided particulate matter to prevent agglomeration, as described in U.S. Pat. Nos. 4,994,534 and 5,200,477 and/or the addition of negative charge generating chemicals to balance positive voltages or the addition of positive charge generating chemicals to neutralize negative voltage potentials as described in U.S. Pat. No. 4,803,251. Antistatic substances can also be added, either continuously or intermittently to prevent or neutralize electrostatic charge generation. Condensing mode operation, such as described in U.S. Pat. Nos. 4,543,399 and 4,588,790 can also be used to assist in heat removal from the fluid bed polymerization reactor.

Additional reactor details and means for operating the reactor can be as described in, for example, U.S. Pat. Nos. 3,709,853; 4,003,712; 4,011,382; 4,302,566; 4,543,399; 4,882,400; 5,352,749; and 5,541,270; EP 0802202.

Catalyst Compositions

The catalyst composition can be or include any catalyst or combination of catalysts. Illustrative catalysts can include, but are not limited to, Ziegler-Natta catalysts, chromium-based catalysts, metallocene catalysts and other catalytic compounds containing uniform polymerization sites single-site catalysts including Group 15-containing catalysts, bimetallic catalysts, and mixed catalysts. The catalyst can also include $AlCl_3$, cobalt, iron, palladium, chromium/chromium oxide or "Phillips" catalysts. Any catalyst can be used alone or in combination with any other catalyst. Catalyst compositions useful olefin polymerizations where the catalyst is in spray-dried form may be particularly benefitted from the methods described herein.

The first and/or second catalyst composition may comprise a metallocene catalyst component. Metallocene catalysts can include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

The Cp ligands are one or more rings or ring system(s), at least a portion of which includes n-bonded systems, such as cycloalkadienyl ligands and heterocyclic analogues. The ring(s) or ring system(s) typically comprise atoms selected from Groups 13 to 16 atoms, and, in some embodiments, the atoms that make up the Cp ligands are selected from carbon, nitrogen, oxygen, silicon, sulfur, phosphorous, germanium, boron, aluminum, and combinations thereof, where carbon makes up at least 50% of the ring members. For example, the Cp ligand(s) may be selected from substituted and unsubstituted cyclopentadienyl ligands and ligands isolobal to cyclopentadienyl. Non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene compound may be selected from Groups 3 through 12 atoms and lanthanide Group atoms; or may be selected from Groups 3 through 10 atoms; or may be selected from Sc, Ti, Zr, Hf, V, Nb, Ta, Mn, Re, Fe, Ru, Os, Co, Rh, Ir, and Ni; or may be selected from Groups 4, 5, and 6 atoms; or may be Ti, Zr, or Hf atoms; or may be Hf; or may be Zr. The oxidation state of the metal atom "M" can range from 0 to +7; or may be +1, +2, +3, +4 or +5; or may be +2, +3 or +4. The groups bound to the metal atom "M" are such that the compounds described below in the structures and structures are electrically neutral, unless otherwise indicated. The Cp ligand(s) forms at least one chemical bond with the metal atom M to form the "metallocene catalyst component." The Cp ligands are distinct from the leaving groups bound to metal atom M in that they are not highly susceptible to substitution/abstraction reactions.

The metallocene catalyst component may include compounds represented by Structure (I):

$$Cp^A Cp^B MX_n \qquad (I)$$

where M is as described above; each X is chemically bonded to M; each Cp group is chemically bonded to M; and n is 0 or an integer from 1 to 4. In some embodiments, n is either 1 or 2.

The ligands represented by $Cp^A$ and $Cp^B$ in Structure (I) may be the same or different cyclopentadienyl ligands or ligands isolobal to cyclopentadienyl, either or both of which may contain heteroatoms and either or both of which may be substituted by a group R. For example, $Cp^A$ and $Cp^B$ may be independently selected from cyclopentadienyl, indenyl, tetrahydroindenyl, fluorenyl, and substituted derivatives of each.

Independently, each $Cp^A$ and $Cp^B$ of Structure (I) may be unsubstituted or substituted with any one or combination of substituent groups R. Non-limiting examples of substituent groups R as used in Structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyl thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with Structure (I) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins, such as, but not limited to, olefinically unsaturated substituents including vinyl-terminated ligands, for example 3-butenyl, 2-propenyl, 5-hexenyl, and the like. In some embodiments, at least two R groups, for example, two adjacent R groups, are joined to form a ring structure having from 3 to 30 atoms selected from carbon, nitrogen, oxygen, phosphorous, silicon, germanium, aluminum, boron and combinations thereof. Also, a substituent R group, such as 1-butanyl, may form a bonding association to the element M.

Each X in Structure (I), above, and Structures (II)—(Va-d), below, is independently selected from: for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, X is a $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, or $C_1$ to $C_{12}$ heteroatom-containing hydrocarbons, and substituted derivatives thereof. X may be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, or $C_7$ to $C_{18}$ fluoroalkylaryls; or X may be selected from hydride, chloride, fluoride, methyl, phenyl, phenoxy, benzoxy, tosyl, fluoromethyls, and fluorophenyls; or X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls; or X may be selected from chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls; or X may be selected from fluoride, methyl, ethyl, propyl, phenyl, methylphenyl, dimethylphenyl, trimethylphenyl, fluoromethyls (mono-, di- and trifluoromethyls), and fluorophenyls (mono-, di-, tri-, tetra- and pentafluorophenyls). In some embodiments, at least one X is a halogenated aryloxy group or a derivative thereof. For example, at least one X may be a pentafluorophenoxy group.

A metallocene catalyst component of the first and/or second catalyst composition may include those metallocenes of Structure (I) where $Cp^A$ and $Cp^B$ are bridged to each other by at least one bridging group, (A), such that the structure is represented by Structure (II):

$$Cp^A(A)Cp^BMX_n \qquad (II)$$

These bridged compounds represented by Structure (II) are known as "bridged metallocenes." $Cp^A$, $Cp^B$, M, X and n in Structure (II) are as defined above for Structure (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, and divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof wherein the heteroatom may also be $C_1$ to $C_{12}$ alkyl or aryl substituted to satisfy neutral valency. The bridging group (A) may also contain substituent groups R as defined above for Structure (I) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P=(wherein "=" represents two chemical bonds), where R' is independently selected from hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In some embodiments, the bridged metallocene catalyst component of Structure (II) has two or more bridging groups (A).

Other non-limiting examples of bridging group (A), in Structure (II), include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In some embodiments, bridging group (A), in Structure (II), may also be cyclic, comprising, 4 to 10 ring members or 5 to 7 ring members. The ring members may be selected from the elements mentioned above, or from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination thereof.

The cyclic bridging groups (A) may be saturated or unsaturated and/or carry one or more substituents and/or be fused to one or more other ring structures. If present, the one or more substituents may be a hydrocarbyl (e.g., alkyl such as methyl) or halogen (e.g., F, Cl). The one or more Cp groups which the above cyclic bridging moieties may optionally be fused to may be saturated or unsaturated and are selected from those having 4 to 10, more particularly 5, 6, or 7 ring members (selected from C, N, O and S in a particular embodiment), such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In some embodiments, the ligands $Cp^A$ and $Cp^B$ of Structures (I) and (II) may be different from each other, or in other embodiments may be the same as each other.

A metallocene catalyst component of the first and/or second catalyst composition may include mono-ligand metallocene compounds, such as, monocyclopentadienyl catalyst components, as described in WO 93/08221.

A metallocene catalyst component may be an unbridged "half sandwich" metallocene represented by Structure (III):

$$Cp^AMQ_qX_n \qquad \text{(III)}$$

where $Cp^A$ is defined as for the Cp groups in Structure (I) and is a ligand that is bonded to M; each Q is independently bonded to M; Q is also bound to $Cp^A$ in one embodiment; X is a leaving group as described above in Structure (I); n ranges from 0 to 3, or is 1 or 2; q ranges from 0 to 3, or is 1 or 2.

$Cp^A$ may be selected from cyclopentadienyl, indenyl, tetrahydroindenyl, fluorenyl, substituted version thereof, and combinations thereof. In Structure (III), Q may be selected from ROO$^-$, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkylcarbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

It is contemplated that the metallocene catalysts components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst compound", also referred to herein as the metallocene catalyst component" may comprise any combination of any "embodiment" described herein.

The "Group 15-containing catalyst" useful as first and/or second catalyst compositions may include Group 3 to Group 12 metal complexes, wherein the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP0893454A1; EP 0894005A1; U.S. Pat. Nos. 5,318,935; 5,889,128; 6,333,389; and 6,271,325.

The Group 15-containing catalyst components may include Group 4 imino-phenol complexes, Group 4 bis (amide) complexes, and Group 4 pyridyl-amide complexes that are active towards olefin polymerization to any extent.

The Group 15-containing catalyst component may be represented by Structures (VII) and (VIII):

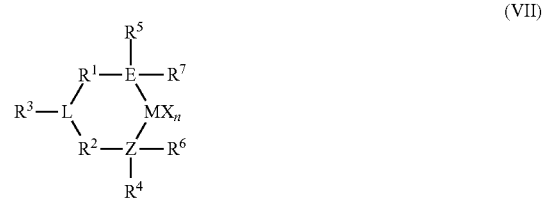

(VII)

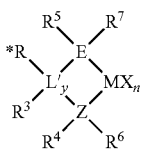

(VIII)

wherein E and Z are Group 15 elements independently selected from nitrogen and phosphorus in one embodiment; and nitrogen in a more particular embodiment, L and L' may or may not form a bond with M; y is an integer ranging from 0 to 2 (when y is 0, group L', *R and R³ are absent); M is selected from Group 3 to Group 5 atoms, or Group 4 atoms, or selected from Zr and Hf; n is an integer ranging from 1 to 4, or from 2 to 3; and each X is as defined above.

In Structure (VII), L may be selected from Group 15 atoms, Group 16 atoms, Group 15-containing hydrocarbylenes, and a Group 16-containing hydrocarbylenes; wherein R³ is absent when L is a Group 16 atom. In some embodiments, when R³ is absent, L is selected from heterocyclic hydrocarbylenes; or L is selected from nitrogen, phosphorous, anilinyls, pyridyls, quinolyls, pyrrolyls, pyrimidyls, purinyls, imidazyls, indolyls; $C_1$ to $C_6$ alkyl substituted groups selected from anilinyls, pyridyls, quinolyls, pyrrolyls, pyrimidyls, purinyls, imidazyls, and indolyls; $C_1$ to $C_6$ alkylamine substituted groups selected from anilinyls, pyridyls, quinolyls, pyrrolyls, pyrimidyls, purinyls, imidazyls, indolyls; amine substituted anilinyls, pyridyls, quinolyls, pyrrolyls, pyrimidyls, purinyls, imidazyls, and indolyls; hydroxy substituted groups selected from anilinyls, pyridyls, quinolyls, pyrrolyls, pyrimidyls, purinyls, imidazyls, and indolyls; methyl-substituted phenylamines, substituted derivatives thereof, and chemically bonded combinations thereof.

In Structure (VIII), L' is selected from Group 15 atoms, Group 16 atoms, and Group 14 atoms in one embodiment; and selected from Group 15 and Group 16 atoms in a more particular embodiment; and is selected from groups as defined by L above in yet a more particular embodiment, wherein "EZL" and "EZL'" may be referred to as a "ligand", the EZL and EZL' ligands comprising the R* and $R^1$-$R^7$ groups;

In Structure (VII), $R^1$ and $R^2$ are independently: divalent bridging groups selected from alkylenes, arylenes, heteroatom containing alkylenes, heteroatom containing arylenes, substituted alkylenes, substituted arylenes and substituted heteroatom containing alkylenes, wherein the heteroatom is selected from silicon, oxygen, nitrogen, germanium, phosphorous, boron and sulfur; or is selected from $C_1$ to $C_{20}$ alkylenes, $C_6$ to $C_{12}$ arylenes, heteroatom-containing $C_1$ to $C_{20}$ alkylenes, and heteroatom-containing $C_6$ to $C_{12}$ arylenes; or is selected from —CH₂—, —C(CH₃)₂—, —C(C₆H₅)₂—, —CH₂CH₂—, —CH₂CH₂CH₂—, —Si(CH₃)₂—, —Si(C₆H₅)₂—, —C₆H₁₀—, C₆H₄—, and substituted derivatives thereof, the substitutions including $C_1$ to $C_4$ alkyls, phenyl, and halogen radicals.

In Structure (VIII), R³ may be absent; or may be a group selected from hydrocarbyl groups, hydrogen radical, halogen radicals, and heteroatom-containing groups; or may be selected from linear alkyls, cyclic alkyls, and branched alkyls having 1 to 20 carbon atoms.

In Structure (VIII), *R may be absent; or may be a group selected from hydrogen radical, Group 14 atom containing groups, halogen radicals, and heteroatom-containing groups.

In Structures (VII) and (VIII), $R^4$ and $R^5$ are independently: groups selected from alkyls, aryls, substituted aryls, cyclic alkyls, substituted cyclic alkyls, cyclic arylalkyls, substituted cyclic arylalkyls, and multiple ring systems, wherein each group has up to 20 carbon atoms, or between 3 and 10 carbon atoms; or is selected from $C_1$ to $C_{20}$ alkyls, $C_1$ to $C_{20}$ aryls, $C_1$ to $C_{20}$ arylalkyls, and heteroatom-containing groups (for example PR₃, where R is an alkyl group).

In Structures (VII) and (VIII), $R^6$ and $R^7$ are independently: absent; or are groups selected from hydrogen radicals, halogen radicals, heteroatom-containing groups and hydrocarbyls; or are selected from linear, cyclic and branched alkyls having from 1 to 20 carbon atoms; wherein $R^1$ and $R^2$ may be associated with one another, and/or $R^4$ and $R^5$ may be associated with one another as through a chemical bond.

Described yet more particularly, the Group 15-containing catalyst component can be described as the embodiments shown in Structures (IX), (X) and (XI) (where "N" is nitrogen):

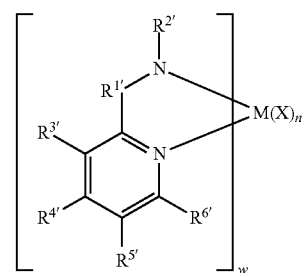

(IX)

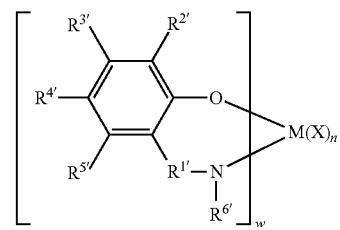

(X)

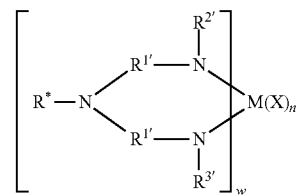

(XI)

wherein Structure (IX) represents pyridyl-amide structures, Structure (X) represents imino-phenol structures, and Structure (XI) represents bis(amide) structures. In these Structures, w is an integer from 1 to 3, or is 1 or 2, or is 1 in some embodiments. M is a Group 3 to Group 13 element, or a Group 3 to Group 6 element, or Group 4 element in some embodiments. Each X is independently selected from hydrogen radicals, halogen ions (desirably, anions of fluorine, chlorine, and bromine); $C_1$ to $C_6$ alkyls; $C_1$ to $C_6$ fluoroalkyls, $C_6$ to $C_{12}$ aryls; $C_6$ to $C_{12}$ fluoroalkyls, $C_1$ to $C_6$ alkoxys, $C_6$ to $C_{12}$ aryloxys, and $C_7$ to $C_{18}$ alkylaryloxys. n is an integer ranging from 0 to 4, or from 1 to 3, or from 2 to 3, or is 2 in some embodiments.

Further, in Structures (IX), (X), and (XI), $R^{1\prime}$ may be selected from hydrocarbylenes and heteroatom-containing hydrocarbylenes, or may be selected from —$SiR_2$—, alkylenes, arylenes, alkenylenes and substituted alkylenes, substituted alkenylenes and substituted arylenes; or may be selected from —$SiR_2$—, $C_1$ to $C_6$ alkylenes, $C_6$ to $C_{12}$ arylenes, $C_1$ to $C_6$ substituted alkylenes and $C_6$ to $C_{12}$ substituted arylenes, wherein R is selected from $C_1$ to $C_6$ alkyls and $C_6$ to $C_{12}$ aryls.

Further, in Structures (IX), (X), and (XI), $R^{1\prime}$ $R^{2\prime}$, $R^{3\prime}$, $R^{4\prime}$, $R^{5\prime}$, $R^{6\prime}$ and R* are independently selected from hydride, $C_1$ to $C_{10}$ alkyls, $C_6$ to $C_{12}$ aryls, $C_6$ to $C_{18}$ alkylaryls, $C_4$ to $C_{12}$ heterocyclic hydrocarbyls, substituted $C_1$ to $C_{10}$ alkyls, substituted $C_6$ to $C_{12}$ aryls, substituted $C_6$ to $C_{18}$ alkylaryls, and substituted $C_4$ to $C_{12}$ heterocyclic hydrocarbyls and chemically bonded combinations thereof. In some embodiments, R* is absent. In some embodiments, R*—N represents a nitrogen containing group or ring such as a pyridyl group or a substituted pyridyl group that is bridged by the $R^{1\prime}$ groups. In some embodiments, R*—N is absent, and the $R^{1\prime}$ groups form a chemical bond to one another.

In some embodiments of Structures (IX), (X), and (XI), $R^{1\prime}$ is selected from methylene, ethylene, 1-propylene, 2-propylene, =$Si(CH_3)_2$, =$Si(phenyl)_2$, —CH=, —$C(CH_3)$=, —$C(phenyl)_2$-, —$C(phenyl)$=(wherein "=" represents two chemical bonds), and the like.

In a particular embodiment of Structure (X), $R^{2\prime}$ and $R^{4\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 2-methyl-4-chlorophenyl, 2-n-propyl-4-chlorophenyl, 2-iso-propyl-4-chlorophenyl, 2-iso-butyl-4-chlorophenyl, 2-tert-butyl-4-chlorophenyl, 2-methyl-4-fluorophenyl, 2-n-propyl-4-fluorophenyl, 2-iso-propyl-4-fluorophenyl, 2-iso-butyl-4-fluorophenyl, 2-tert-butyl-4-fluorophenyl, 2-methyl-4-bromophenyl, 2-n-propyl-4-bromophenyl, 2-iso-propyl-4-bromophenyl, 2-iso-butyl-4-bromophenyl, 2-tert-butyl-4-bromophenyl, and the like.

In some embodiments of Structures (IX) and (XI), $R^{2\prime}$ and $R^{3\prime}$ are selected from 2-methylphenyl, 2-n-propylphenyl, 2-iso-propylphenyl, 2-iso-butylphenyl, 2-tert-butylphenyl, 2-fluorophenyl, 2-chlorophenyl, 2-bromophenyl, 4-methylphenyl, 4-n-propylphenyl, 4-iso-propylphenyl, 4-iso-butylphenyl, 4-tert-butylphenyl, 4-fluorophenyl, 4-chlorophenyl, 4-bromophenyl, 6-methylphenyl, 6-n-propylphenyl, 6-iso-propylphenyl, 6-iso-butylphenyl, 6-tert-butylphenyl, 6-fluorophenyl, 6-chlorophenyl, 6-bromophenyl, 2,6-dimethylphenyl, 2,6-di-n-propylphenyl, 2,6-di-iso-propylphenyl, 2,6-di-isobutylphenyl, 2,6-di-tert-butylphenyl, 2,6-difluorophenyl, 2,6-dichlorophenyl, 2,6-dibromophenyl, 2,4,6-trimethylphenyl, 2,4,6-tri-n-propylphenyl, 2,4,6-tri-iso-propylphenyl, 2,4,6-tri-iso-butylphenyl, 2,4,6-tri-tert-butylphenyl, 2,4,6-trifluorophenyl, 2,4,6-trichlorophenyl, 2,4,6-tribromophenyl, 2,3,4,5,6-pentafluorophenyl, 2,3,4,5,6-pentachlorophenyl, 2,3,4,5,6-pentabromophenyl, and the like.

In some embodiments of Structures (IX), (X), and (XI), X is independently selected from fluoride, chloride, bromide, methyl, ethyl, phenyl, benzyl, phenyloxy, benzloxy, 2-phenyl-2-propoxy, 1-phenyl-2-propoxy, 1-phenyl-2-butoxy, 2-phenyl-2-butoxy and the like.

Non-limiting examples of the Group 15-containing catalyst component are represented by Structures (XIIa)-(XIIf) (where "N" is nitrogen):

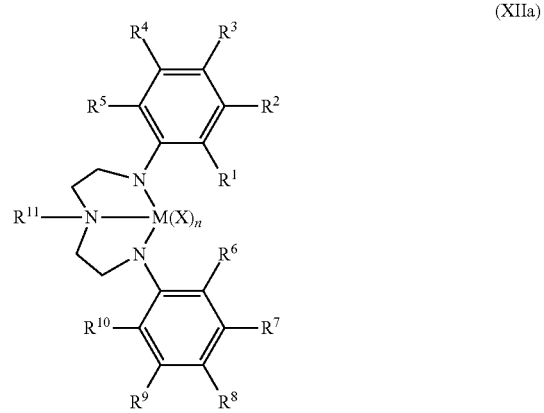

(XIIa)

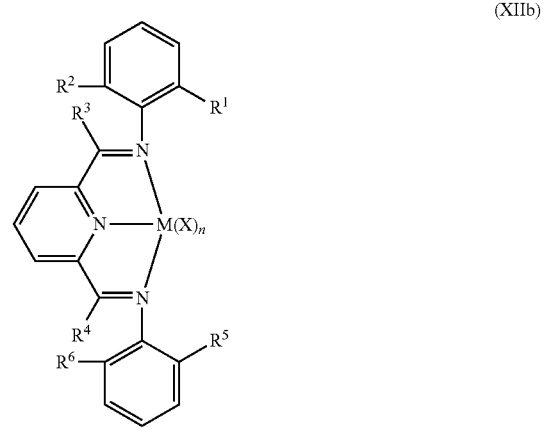

(XIIb)

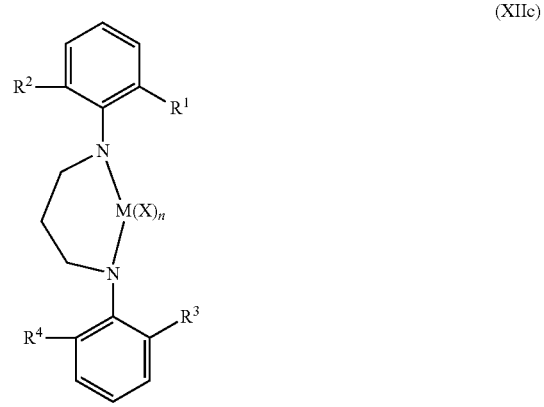

(XIIc)

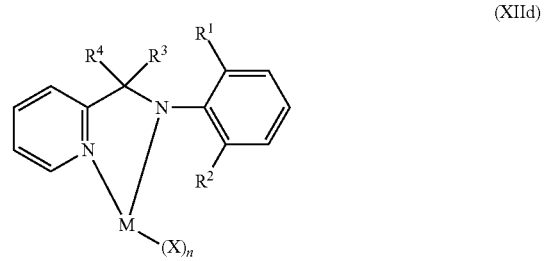

(XIId)

-continued

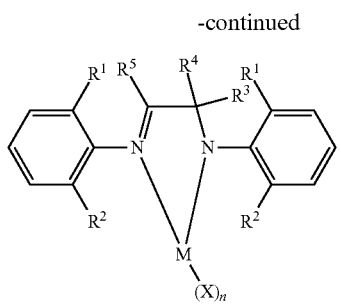
(XIIe)

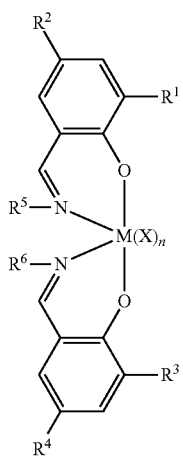
(XIIf)

wherein in Structures (XIIa) through (XIIf), M is selected from Group 4 atoms or is selected from Zr and Hf; and wherein $R^1$ through $R^{11}$ in Structures (XIIa) through (XIIf) are selected from hydride, fluorine radical, chlorine radical, bromine radical, methyl, ethyl, n-propyl, isopropyl, n-butyl, isobutyl, tert-butyl and phenyl; and X is selected from fluorine ion, chlorine ion, bromine ion, methyl, phenyl, benzyl, phenyloxy and benzyloxy; and n is an integer ranging from 0 to 4, or from 2 to 3.

The catalyst me be a mixed catalyst which may comprise a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

The catalyst can be or include a mixed catalyst that includes at least one metallocene component. The catalyst may be a mixed catalyst system that includes at least one metallocene component and at least one Group-15 containing component. The metallocene components and Group-15 containing components may be as described above. For example, the mixed catalyst may comprise [(2,4,6-$Me_3C_6H_2$)$NCH_2CH_2$]$_2$NHHfBz$_2$ or [(2,4,6-$Me_3C_6H_2$)$NCH_2CH_2$]$_2$NHZrBz$_2$ or [(2,3,4,5,6-$Me_5C_6$)$NCH_2CH_2$]$_2$NHZrBz$_2$, where Bz is a benzyl group, combined with bis(indenyl)zirconium dichloride, (pentamethylcyclopenta-dienyl)(n-propylcyclopentadienyl)zirconium dichloride, or (tetramethylcyclopentadienyl)(n-propylcyclopentadienyl) zirconium dichloride.

An example of mixed catalyst system suitable for use herein are the PRODIGY™ Bimodal Catalysts available from Univation Technologies.

The polymerization process may be carried out such that the catalyst composition is heterogeneous and the catalyst composition comprises at least one support material. The support material may be any material known in the art for supporting catalyst compositions, such as an inorganic oxide, preferably silica, alumina, silica-alumina, magnesium chloride, graphite, magnesite, titania, zirconia, and montmorillonite, any of which can be chemically/physically modified such as by fluoriding processes, calcining, or other processes known in the art. In an embodiment, the support material may be a silica material having an average particle size as determined by Malvern analysis of from 0.1 to 100 μm, or 10 to 50 μm.

An activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds, ionizing activators (neutral or ionic) such as tri (n-butyl)ammonium tetrakis(pentafluorophenyl)boron may also be used, and combinations thereof. The molar ratio of metal in the activator to metal in the catalyst composition can range from 1000:0.1 to 0.5:1, 300:1 to 0.5:1, 150:1 to 1:1, 50:1 to 1:1, 10:1 to 0.5:1, or 3:1 to 0.3:1.

The catalyst compositions can include a support material or carrier. As used herein, the terms "support" and "carrier" are used interchangeably and refer to any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof. Relatively small, non-porous supports may be beneficial, e.g., silica particles having a diameter of about 15 to about 200 nm suitable for forming spray-dried catalyst particles having a diameter of about 20 to about 40 μm.

The catalyst may be selected from the group consisting of [(2,4,6-$Me_3C_6H_2$)$NCH_2CH_2$]$_2$NHHfBz$_2$, [(2,4,6-$Me_3C_6H_2$)$NCH_2CH_2$]$_2$NHZrBz$_2$ or [(2,3,4,5,6-$Me_5C_6$)$NCH_2CH_2$]$_2$NHZrBz$_2$, where Bz is a benzyl group and bis(n-propylcyclopentadienyl)hafnium dichloride. The catalyst composition may further include a catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

The catalyst composition may comprise a bimodal catalyst composition. Thus, the catalyst composition may include a catalyst selected from the group consisting of [(2,4,6-$Me_3C_6H_2$)$NCH_2CH_2$]$_2$NHHfBz$_2$, [(2,4,6-$Me_3C_6H_2$)$NCH_2CH_2$]$_2$NHZrBz$_2$ or [(2,3,4,5,6-$Me_5C_6$)$NCH_2CH_2$]$_2$ NHZrBz$_2$, where Bz is a benzyl group and bis(n-propylcyclopentadienyl)hafnium dichloride. It may further includes an additional metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

The catalyst composition can be introduced to the catalyst delivery system or to the reactor at a flow rate from a low of about 0.001 kg/hr, about 0.005 kg/hr, about 0.02 kg/hr, 0.1 kg/hr, about 0.5 kg/hr, about 1 kg/hr, about 1.5 kg/hr, about 2 kg/hr, or about 3 kg/hr to a high of about 5 kg/hr, about 10 kg/hr, about 15 kg/hr, about 20 kg/hr, or about 25 kg/hr, with suitable ranges comprising the combination of any two values. For example, the catalyst can be introduced at a flow rate of about 0.4 kg/hr to about 23 kg/hr, about 1.4 kg/hr to about 14 kg/hr, or about 2.3 kg/hr to about 4.5 kg/hr. The catalyst can be or include fully formed catalyst particles suspended in one or more inert liquids, e.g., in the form of a catalyst slurry or suspension. For example, the concentration of the catalyst particles in a catalyst slurry can range from a low of about 1 wt %, about 5 wt %, about 12 wt %, or about 15 wt % to a high of about 20 wt %, about 23 wt %, about 25 wt %, or about 30 wt %, with suitable ranges comprising the combination of any two values. The catalyst can be slurried in any suitable liquid or combination of liquids. Suitable liquids for forming the catalyst slurry can include, but are not limited to, toluene, ethylbenzene, xylene, pentane, hexane, heptane, octane, other hydrocarbons, or any combination thereof. One or more mineral oils or other non-reactive liquid hydrocarbons can also be used to form the catalyst slurry. The catalyst system can also be in the form of a powder, e.g., a spray dried catalyst, a liquid, or a slurry.

The reactor can be operated in condensed mode using an ICA. The amount of ICAs that can be introduced to the reactor can provide an ICA concentration within the polymerization reactor ranging from a low of about 1 mol %, about 5 mol %, or about 10 mol % to a high of about 25 mol %, about 35 mol %, or about 45 mol %, with suitable ranges comprising the combination of any two values. For example, the concentration of the ICA(s), if present, can range from about 14 mol %, about 16 mol %, or about 18 mol % to a high of about 20 mol %, about 22 mol %, or about 24 mol %, with suitable ranges comprising the combination of any two values. Suitable ICAs are known in the art.

Continuity Additives

As used herein, a continuity aid is a chemical composition which, when introduced into a fluidized bed reactor, may influence or drive the static charge (negatively, positively, or to zero) in the fluidized bed. The specific continuity aid used may depend upon the nature of the static charge, and the choice of continuity aid may vary dependent upon the polymer being produced and the catalyst compound(s) being used.

Continuity aids such as aluminum stearate may be employed. The continuity aid used may be selected for its ability to receive the static charge in the fluidized bed without adversely affecting productivity. Suitable continuity aid may include aluminum distearate, ethoxlated amines, and anti-static compositions such as those provided by Innospec Inc. under the trade name OCTASTAT™. For example, OCTASTAT™ 2000 is a mixture of a polysulfone copolymer, a polymeric polyamine, and oil-soluble sulfonic acid.

Any of the aforementioned continuity aids, as well as those described in, for example, WO 01/44322, listed under the heading Carboxylate Metal Salt and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include, ethyleneimine additives useful in embodiments disclosed herein may include polyethyleneimines having the following general formula:

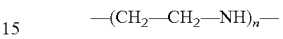

where n can be from about 10 to about 10,000. Commercial polyethyleneimine can be a compound having branches of the ethyleneimine polymer. Suitable polyethyleneimines are commercially available from BASF Corporation under the trade name Lupasol. Another useful continuity additive can include a mixture of aluminum distearate and an ethoxylated amine type compound, e.g., IRGASTAT™ AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt % to about 50 wt % or about 10 wt % to about 40 wt %, or about 15 wt % to about 30 wt %.

The continuity additive(s) may be added to the reactor in an amount ≥0.05 ppm, e.g., ≥0.10 ppm, ≥1.0 ppm, ≥2.0 ppm, ≥4.0 ppm, ≥10.0 ppm, ≥20.0 ppm, ≥30.0 ppm, ≥40.0 ppm, ≥50.0 ppm, ≥60.0 ppm, ≥70.0 ppm, ≥80.0 ppm, ≥90.0 ppm, ≥100.0 ppm, ≥125.0 ppm, ≥150.0 ppm, or ≥175.0 ppm, based on the weight of all feeds to the reactor, excluding recycle. Additionally or alternatively the amount of continuity additive may be ≤200.0 ppm, e.g., ≤175.0 ppm, ≤150.0 ppm, ≤125.0 ppm, ≤100.0 ppm, ≤90.0 ppm, ≤80.0 ppm, ≤70.0 ppm, ≤60.0 ppm, ≤50.0 ppm, ≤40.0 ppm, ≤30.0 ppm, ≤20.0 ppm, ≤10.0 ppm, ≤4.0 ppm, ≤2.0 ppm, ≤1.0 ppm, or ≤0.10 ppm. Ranges of the concentration of the continuity aid that are expressly disclosed comprise ranges formed by pairs of any of the above-enumerated values, e.g., 2.0 to 100.0 ppm, 4.0 to 50.0 ppm, 10.0 to 40.0 ppm etc.

Polyolefin Products

The polyolefin products made in the steps of forming a first polyolefin, forming a second polyolefin composition, and forming a third polyolefin can be or include any type of polyolefin. Exemplary polyolefins can include, but are not limited to, polyolefins comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, or $C_3$ to $C_{10}$ alpha-olefins. Preferred polyolefins include, but are not limited to, polymers comprising ethylene, including but not limited to ethylene copolymerized with a $C_3$ to $C_{40}$ olefin, preferably a $C_3$ to $C_{20}$ alpha olefin, such as propylene and/or butene.

Preferred polymer products include homopolymers or copolymers of $C_2$ to $C_{40}$ olefins, preferably $C_2$ to $C_{20}$ olefins, such as copolymers of an alpha-olefin and another olefin or alpha-olefin (ethylene can be defined to be an alpha-olefin). In one or more embodiments, the polymers are or include homopolyethylene, homopolypropylene, propylene copolymerized with ethylene and or butene, ethylene copolymerized with one or more of propylene, butene or hexene, and optional dienes. Examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymers of propylene and ethylene and/or butene and/or hexene, elastomers such as ethylene propylene rubber, ethylene propylene diene monomer rubber, neoprene, and blends of thermoplastic polymers and elastomers, such as for example thermoplastic elastomers and rubber toughened plastics.

The polyolefin compositions may be characterized by their density. Density can be determined in accordance with ASTM D-792. Density is expressed as grams per cubic centimeter (g/cm$^3$) unless otherwise noted. The polyolefin compositions can have a density of ≥about 0.870 g/cm$^3$, e.g., ≥about 0.880 g/cm$^3$, ≥about 0.890 g/cm$^3$, ≥about 0.900 g/cm$^3$, ≥about 0.910 g/cm$^3$, ≥about 0.920 g/cm$^3$, ≥about 0.930 g/cm$^3$, ≥about 0.940 g/cm$^3$, ≥about 0.950 g/cm$^3$, or ≥about 0.960 g/cm$^3$. Additionally or alternatively, the density of the polyolefin compositions may be ≤about 0.970 g/cm$^3$, e.g., ≤about 0.970 g/cm$^3$, ≤about 0.970 g/cm$^3$, ≤about 0.970 g/cm$^3$, ≤about 0.960 g/cm$^3$, ≤about 0.950 g/cm$^3$, ≤about 0.940 g/cm$^3$, ≤about 0.930 g/cm$^3$, ≤about 0.920 g/cm$^3$, ≤about 0.910 g/cm$^3$, ≤about 0.900 g/cm$^3$, ≤about 0.890 g/cm$^3$, ≤or about 0.880 g/cm$^3$. Ranges of the density that are expressly disclosed comprise ranges formed by pairs of any of the above-enumerated values, e.g., 0.870 to about 0.970 g/cm$^3$, 0.880 to about 0.960 g/cm$^3$, about 0.890 to about 0.950 g/cm$^3$, 0.900 to about 0.940 g/cm$^3$, 0.910 to about 09.30 g/cm$^3$, etc.

The process may be characterized by the density difference between sequentially formed products. Thus, the difference between the target density, $\rho_1$, of the first of the first polyolefin composition and the target density, $\rho_2$, of the second polyolefin composition may be ≤0.0050 g/cm$^3$, e.g., ≤0.0045 g/cm$^3$, ≤0.0040 g/cm$^3$, ≤0.0035 g/cm$^3$, ≤0.0030 g/cm$^3$, ≤0.0025 g/cm$^3$, ≤0.0020 g/cm$^3$, ≤0.0015 g/cm$^3$, or ≤0.0010 g/cm$^3$. Additionally or alternatively, the difference in the first and second target densities, $\rho_1$ and $\rho_2$, may be ≥0.0005 g/cm$^3$, e.g., ≥0.0010 g/cm$^3$, ≥0.0015 g/cm$^3$, ≥0.0020 g/cm$^3$, ≥0.0025 g/cm$^3$, ≥0.0030 g/cm$^3$, ≥0.0035 g/cm$^3$, ≥0.0040 g/cm$^3$, or ≥0.0045 g/cm$^3$. Ranges of the difference in the first and second target densities may comprise any ranges formed by any of the combination of the values expressly disclosed, e.g., 0.0005 to 0.0050 g/cm$^3$, 0.0010 to 0.0045 g/cm$^3$, 0.0015 to 0.0040 g/cm$^3$, 0.0020 to 0.0035 g/cm$^3$, 0.0025 to 0.0030 g/cm$^3$, etc.

Where a third polyolefin composition is formed, the difference between the target density, $\rho_1$, of the first of the first polyolefin composition and the target density, $\rho_3$, of the third polyolefin composition may be ≤0.0050 g/cm$^3$, e.g., ≤0.0045 g/cm$^3$, ≤0.0040 g/cm$^3$, ≤0.0035 g/cm$^3$, ≤0.0030 g/cm$^3$, ≤0.0025 g/cm$^3$, ≤0.0020 g/cm$^3$, ≤0.0015 g/cm$^3$, or ≤0.0010 g/cm$^3$. Additionally or alternatively, the difference in the first and second target densities, $\rho_1$ and $\rho_2$, may be ≥0.0005 g/cm$^3$, e.g., ≥0.0010 g/cm$^3$, ≥0.0015 g/cm$^3$, ≥0.0020 g/cm$^3$, ≥0.0025 g/cm$^3$, ≥0.0030 g/cm$^3$, ≥0.0035 g/cm$^3$, ≥0.0040 g/cm$^3$, or ≥0.0045 g/cm$^3$. Ranges of the difference in the first and second target densities comprise ranges formed by any of the combination of the values expressly disclosed, e.g., 0.0005 to 0.0050 g/cm$^3$, 0.0010 to 0.0045 g/cm$^3$, 0.0015 to 0.0040 g/cm$^3$, 0.0020 to 0.0035 g/cm$^3$, 0.0025 to 0.0030 g/cm$^3$, etc. Preferably the difference between $\rho_1$ and $\rho_3$ is less than the difference between $\rho_1$ and $\rho_2$.

The polyolefin compositions may be characterized by Flow Index, also referred to as $I_{21}$ or $I_{21.6}$. The Flow Index may be ≥about 1.0, e.g., ≥about 2.0, ≥about 2.5, ≥about 4.0, ≥about 5.0, ≥about 7.0, ≥about 10.0, ≥about 25.0, ≥about 50.0, ≥about 100.0, ≥about 125.0, ≥about 250.0, ≥about 500.0, or ≥about 750.0. Additionally or alternatively the Flow Index may be ≤about 1000.0 g/10 min., e.g., ≤about 750.0 g/10 min., ≤about 500.0 g/10 min., ≤about 250.0 g/10 min., ≤about 125.0 g/10 min., ≤about 100.0 g/10 min., ≤about 50.0 g/10 min., ≤about 25.0 g/10 min., ≤about 10.0 g/10 min., ≤about 7.0 g/10 min., ≤about 5.0 g/10 min., ≤about 4.0 g/10 min., ≤about 2.5 g/10 min., or ≤about 2.0 g/10 min. Ranges of the Flow Index of the polyolefin compositions made by processes herein comprise ranges formed by any of the combination of the values expressly disclosed, e.g., about 1.0 to about 1000.0 g/10 min, about 2.0 to about 750.0 g/10 min, about 2.5 to about 500.0 g/10 min, about 4.0 to about 250.0 g/10 min, about 5.0 to about 125.0 g/10 min, about 7.0 to about 100.0 g/10 min, about 10.0 to about 50.0 g/10 min, etc.

Thus, the methods may include forming a first polyolefin having a target Flow Index, $FI_1$, meeting any of the above described values or ranges. Where the first catalyst comprises a bimodal catalyst composition, the target Flow Index, $FI_1$, may be ≥about 1.0 g/10 min, e.g., ≥about 2.0 g/10 min., ≥about 2.5 g/10 min., ≥about 4.0 g/10 min., ≥about 5.0 g/10 min., ≥about 7.0 g/10 min. Additionally or alternatively, the target Flow Index, $FI_1$, may be ≤about 10.0 g/10 min., e.g., ≤about 7.0 g/10 min., ≤about 5.0 g/10 min., ≤about 4.0 g/10 min., ≤about 2.5 g/10 min., or ≤about 2.0 g/10 min. Ranges of the Flow Index, $FI_1$, in some embodiments where the first catalyst comprises a bimodal catalyst composition comprise ranges formed by any of the combination of the above-enumerated values are expressly disclosed, e.g., about 1.0 to about 10.0 g/min., about 2.0 to about 7.0 g/10 min., about 2.5 to about 5.0 g/10 min., about 4.0 to about 5.0 to about 7.0 g/10 min., etc.

Where the first catalyst comprises a unimodal catalyst composition, the target Flow Index, $FI_1$, may be ≤about 1000.0 g/10 min.; e.g., ≤about 1000.0 g/10 min., ≤about 950.0 g/10 min., ≤about 900.0 g/10 min., ≤about 850.0 g/10 min., ≤about 800.0 g/10 min., ≤about 750.0 g/10 min., ≤about 700.0 g/10 min., ≤about 650.0 g/10 min., ≤about 600.0 g/10 min., or ≤about 550.0 g/10 min. Additionally or alternatively, the target Flow Index, $FI_1$, where the first catalyst comprises a unimodal catalyst composition may may be ≥about 500.0 g/10 min., ≥about 550.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., ≥about 950.0 g/10 min. Ranges of the Flow Index, $FI_1$, where the first catalyst comprises a unimodal catalyst composition comprise ranges formed by any of the combination of the above-enumerated values are expressly disclosed, e.g., about 500.0 to about 1000.0 g/10 min., 550.0 to about 950.0 g/10 min., 600.0 to about 900.0 g/10 min., 650.0 to about 850.0 g/10 min., 700.0 to about 800.0 g/10 min., etc.

Forming a second polyolefin having a target Flow Index, $FI_2$, may include forming a second polyolefin having a target Flow Index, $FI_2$, according to any value or range Flow Index as described above for the polyolefin compositions. Where the second catalyst compositions comprises a bimodal catalyst composition, the target Flow Index, $FI_2$, may be ≥about 1.0 g/10 min, e.g., ≥about 2.0 g/10 min., ≥about 2.5 g/10 min., ≥about 4.0 g/10 min., ≥about 5.0 g/10 min., ≥about 7.0 g/10 min. Additionally or alternatively, the target Flow Index, $FI_2$, may be ≤about 10.0 g/10 min., e.g., ≤about 7.0 g/10 min., ≤about 5.0 g/10 min., ≤about 4.0 g/10 min., ≤about 2.5 g/10 min., or ≤about 2.0 g/10 min. Ranges of the Flow Index, $FI_2$, where the second catalyst comprises a bimodal catalyst composition comprise ranges formed by any of the combination of the above-enumerated values are expressly disclosed, e.g., about 1.0 to about 10.0 g/min., about 2.0 to about 7.0 g/10 min., about 2.5 to about 5.0 g/10 min., about 4.0 g/10 min., about 5.0 to about 7.0 g/10 min., etc.

Where the second catalyst comprises a unimodal catalyst composition, the target Flow Index, $FI_2$, may be ≤about 1000.0 g/10 min.; e.g., ≤about 1000.0 g/10 min., ≤about 950.0 g/10 min., ≤about 900.0 g/10 min., ≤about 850.0 g/10 min., ≤about 800.0 g/10 min., ≤about 750.0 g/10 min., ≤about 700.0 g/10 min., ≤about 650.0 g/10 min., ≤about 600.0 g/10 min., or ≤about 550.0 g/10 min. Additionally or alternatively, the target Flow Index, $FI_2$, where the second catalyst comprises a unimodal catalyst composition may may be ≥about 500.0 g/10 min., ≥about 550.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., ≥about 950.0 g/10 min. Ranges of the Flow Index, $FI_2$, where the second catalyst comprises a unimodal catalyst composition comprise ranges formed by any of the combination of the above-enumerated values are expressly disclosed, e.g., about 500.0 to about 1000.0 g/10 min., 550.0 to about 950.0 g/10 min., 600.0 to about 900.0 g/10 min., 650.0 to about 850.0 g/10 min., 700.0 to about 800.0 g/10 min., etc.

The difference between the target Flow Index, $FI_1$, of the first polyolefin composition and the target Flow Index, $FI_2$, of the second polyolefin composition is ≥about 10.0 g/10 min., e.g., ≥about 40.0 g/10 min., ≥about 80.0 g/10 min., ≥about 100.0 g/10 min., ≥about 200.0 g/10 min., ≥about 300.0 g/10 min, ≥about 400.0 g/10 min., ≥about 450.0 g/10 min., ≥about 500.0 g/10 min., ≥about 550.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., or ≥about 950.0 g/10 min. Additionally or alternatively, the difference between the target Flow Index, $FI_1$, of the first polyolefin composition and the target Flow Index, $FI_2$, of the second polyolefin composition may be ≤about 1000.0 g/10 min., e.g., ≤about 950.0 g/10 min., ≤about 900.0 g/10 min., ≤about 850.0 g/10 min., ≤about 800.0 g/10 min., ≤about 750.0 g/10 min., ≤about 700.0 g/10 min., ≤about 650.0 g/10 min., ≤about 600.0 g/10 min., ≤about 550.0 g/10 min., ≤about 500.0 g/10 min., ≤about 450.0 g/10 min., ≤about 400.0 g/10 min., ≤about 300.0 g/10 min., ≤about 200.0 g/10 min., ≤about 100.0 g/10 min., ≤about 80.0 g/10 min., or ≤about 40.0 g/10 min. Ranges of the difference between the target Flow Index, $FI_1$, of the first polyolefin composition and the target Flow Index, $FI_2$, of the second polyolefin composition comprise ranges formed by any of the combination of the above-enumerated values are expressly disclosed, e.g., about 10.0 to about 1000.0 g/10 min., about 40.0 to about 950.0 g/10 min., about 80.0 to about 900.0 g/10 min., about 100.0 to about 850.0 g/10 min., about 200.0 to about 800.0 g/10 min., about 300.0 to about 800.0 g/10 min., about 350.0 to about 800.0 g/min., about 400.0 to about 800.0 g/min., about 500.0 to about 800.0 g/10 min., about 550.0 to about 800.0 g/10 min., about 600.0 to about 800.0 g/10 min., about 650.0 to about 800.0 g/10 min., about 700.0 to about 800.0 g/10 min., about 750.0 to about 800.0 g/10 min., etc.

The method may also be characterized by the ability to transition for the target density, $\rho_1$, to the target density, $\rho_2$, and/or the target Flow Index, $FI_1$, to the target Flow Index, $FI_2$, in a surprisingly short amount of time. The target methods can transition from the first polyolefin composition having the target density $\rho_1$ and the target Flow Index, $FI_1$, to the second polyolefin composition having the target density, $\rho_2$, and the target Flow Index, $FI_2$, are reached after a first transition period comprising ≤5.0 bed turnovers; e.g., ≤5.0 bed turnovers, ≤4.5 bed turnovers, ≤4.0 bed turnovers, ≤3.5 bed turnovers, ≤3.0 bed turnovers, ≤2.5 bed turnovers, ≤2.0 bed turnovers, ≤1.5 bed turnovers or ≤1.0 bed turnovers. Ranges of the number of bed turnovers comprise ranges formed by any of these values, e.g., 1.0 to 5.0 bed turnovers, 1.5 to 4.5 bed turnovers, 2.0 to 4.0 bed turnovers, 2.0 to 3.0 bed turnovers, 2.0 to 2.5 bed turnovers, etc.

In embodiments that include forming a third polyolefin having a target Flow Index, $FI_3$, the target Flow Index, $FI_3$, may be any value or range Flow Index as described above for the polyolefin compositions. Where the third catalyst compositions comprises a bimodal catalyst composition, the target Flow Index, $FI_3$, may be ≥about 1.0 g/10 min, e.g., ≥about 2.0 g/10 min., ≥about 2.5 g/10 min., ≥about 4.0 g/10 min., ≥about 5.0 g/10 min., ≥about 7.0 g/10 min. Additionally or alternatively, the target Flow Index, $FI_3$, may be ≤about 10.0 g/10 min., e.g., ≤about 7.0 g/10 min., ≤about 5.0 g/10 min., ≤about 4.0 g/10 min., ≤about 2.5 g/10 min., or ≤about 2.0 g/10 min. Ranges of the Flow Index, $FI_3$, where the third catalyst comprises a bimodal catalyst composition comprise ranges formed by any of the combination of the above-enumerated values are expressly disclosed, e.g., about 1.0 to about 10.0 g/min., about 2.0 to about 7.0 g/10 min., about 2.5 to about 5.0 g/10 min., about 4.0 g/10 min., about 5.0 to about 7.0 g/10 min., etc.

Where the third catalyst comprises a unimodal catalyst composition, the target Flow Index, $FI_3$, may be ≤about 1000.0 g/10 min.; e.g., ≤about 1000.0 g/10 min., ≤about 950.0 g/10 min., ≤about 900.0 g/10 min., ≤about 850.0 g/10 min., ≤about 800.0 g/10 min., ≤about 750.0 g/10 min., ≤about 700.0 g/10 min., ≤about 650.0 g/10 min., ≤about 600.0 g/10 min., or ≤about 550.0 g/10 min. Additionally or alternatively, the target Flow Index, $FI_3$, where the third catalyst comprises a unimodal catalyst composition may be ≥about 500.0 g/10 min., ≥about 550.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., ≥about 950.0 g/10 min. Ranges of the Flow Index, $FI_3$, where the third catalyst comprises a unimodal catalyst composition comprise ranges formed by any of the combination of the above-enumerated values are expressly disclosed, e.g., about 500.0 to about 1000.0 g/10 min., 550.0 to about 950.0 g/10 min., 600.0 to about 900.0 g/10 min., 650.0 to about 850.0 g/10 min., 700.0 to about 800.0 g/10 min., etc. This is particularly surprising where difference between the Flow Indices is ≥about 100.0 g/10 min., e.g., ≥about 200.0 g/10 min., ≥about 300.0 g/10 min., ≥about 400.0 g/10 min., ≥about 500.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., ≥about 950.0 g/10 min., e.g. about 100.0 to about 1000.0 g/10 min., 200.0 to about 950.0 g/10 min., 300.0 to about 900.0 g/10 min., 400.0 to about 850.0 g/10 min., 500.0 to about 800.0 g/10 min., 550.0 to about 800.0 g/10 min., 600.0 to about 800.0 g/10 min., 650.0 to about 800.0 g/10 min., 600.0 to about 800.0 g/10 min., 650.0 to about 800.0 g/10 min., 700.0 to about 800.0 g/10 min., 750.0 to about 800.0 g/10 min., etc.

The difference between the target Flow Index, $FI_1$, of the first polyolefin composition and the target Flow Index, $FI_3$, of the third polyolefin composition may be ≤1.0 g/10 min., e.g., ≤0.90 g/10 min., ≤0.80 g/10 min., ≤0.70 g/10 min., ≤0.60 g/10 min., ≤0.50 g/10 min., ≤0.40 g/10 min., ≤0.30 g/10 min., ≤0.20 g/10 min., ≤0.10 g/10 min., or about 0.0 g/10 min. Ranges of the difference between the target Flow Indexes, $FI_1$ and $FI_3$ comprise ranges formed by any of the above enumerated values, e.g., about 0.0 to about 1.0 g/10 min., about 0.10 to about 0.90 g/10 min., about 0.20 to about 0.80 g/10 min., 0.30 to about 0.70 g/10/min., 0.40 to about 0.60 g/10 min, etc.

The method may be characterized by the ability to transition for the target density, $\rho_2$, to the target density, $\rho_3$, and/or the target Flow Index, $FI_2$, to the target Flow Index, $FI_3$, in a surprisingly short amount of time. The target methods can transition from the second polyolefin composition having the target density, $\rho2$, and the target Flow Index, $FI_2$, to the third polyolefin composition having the target density, $\rho3$, and the target Flow Index, $FI_3$, after a first transition period comprising ≤5.0 bed turnovers; e.g., ≤5.0 bed turnovers, ≤4.5 bed turnovers, ≤4.0 bed turnovers, ≤3.5 bed turnovers, ≤3.0 bed turnovers, ≤2.5 bed turnovers, ≤2.0 bed turnovers, ≤1.5 bed turnovers or ≤1.0 bed turnovers. Ranges of the number of bed turnovers comprise ranges formed by any of these values, e.g., 1.0 to 5.0 bed turnovers, 1.5 to 4.5 bed turnovers, 2.0 to 4.0 bed turnovers, 2.0 to 3.0 bed turnovers, 2.0 to 2.5 bed turnovers, etc. This is particularly quick where the difference between the Flow Indices is ≥about 100.0 g/10 min., e.g., ≥about 200.0 g/10 min., ≥about 300.0 g/10 min., ≥about 400.0 g/10 min., ≥about 500.0 g/10 min., ≥about 600.0 g/10 min., ≥about 650.0 g/10 min., ≥about 700.0 g/10 min., ≥about 750.0 g/10 min., ≥about 800.0 g/10 min., ≥about 850.0 g/10 min., ≥about 900.0 g/10 min., ≥about 950.0 g/10 min., e.g. about 100.0 to about 1000.0 g/10 min., 200.0 to about 950.0 g/10 min., 300.0 to about 900.0 g/10 min., 400.0 to about 850.0 g/10 min., 500.0 to about 800.0 g/10 min., 550.0 to about 800.0 g/10 min., 600.0 to about 800.0 g/10 min., 650.0 to about 800.0 g/10 min., 600.0 to about 800.0 g/10 min., 650.0 to about 800.0 g/10 min., 700.0 to about 800.0 g/10 min., 750.0 to about 800.0 g/10 min., etc.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Test Methods

Melt Index is determined according to ASTM D-1238-E (190° C./2.16 kg), also sometimes referred to as $I_2$ or $I_{2.16}$. A melt index value measured with a slight large amount of weight is referred to as $I_5$, determined in the same manner as $I_2$, except using 5.0 kg. (190° C./5.0 kg)

Flow Index is also determined according to ASTM D-1238-E but at a temperature of 190° C. using a 21.6 kg mass (i.e., 190° C./21.6 kg).

EXAMPLES

To provide a better understanding of the foregoing discussion, the following non-limiting examples are provided. All parts, proportions and percentages are by weight unless otherwise indicated.

Polymerization Process

In the following Examples, the first catalyst was a mixed catalyst system comprising a first metallocene catalyst compound, $((Me_4Cp)(n\text{-}pr\text{-}Cp)ZrMe_2)$ used as a solution trim catalyst in conjunction with a mixture of a non-metallocene catalyst $([(2,3,4,5,6\text{-}Me_5C_6)NCH_2CH_2]_2NHZrBz_2$, where Bz is a benzyl group) and a second metallocene catalyst, $((Me_4Cp)(n\text{-}pr\text{-}Cp)ZrCl_2$. The first catalyst system also included a methylaluminoxane activator. Similar suitable catalyst systems are known as the PRODIGY™ BMC Catalysts, available from Univation Technologies, LLC (Houston, Tex.). The second catalyst was a unimodal hafnocene catalyst composition comprising bis(n-propylcyclopentadienyl)hafnium dichloride. The transition from the first catalyst composition making a first polyolefin composition to the second catalyst composition making the second polyolefin composition is evaluated using a pilot plant gas phase polymerization process. The polymerization reactions are conducted in a continuous pilot-scale gas phase fluidized bed reactor of 0.57 meters internal diameter and 4 meters in bed height. The unimodal catalyst is typically provided to the reactor as dry supported catalyst composition by a carrier gas flow. The fluidized bed is made up of polymer granules. The gaseous feed streams of ethylene and hydrogen together with liquid comonomer (hexene) are mixed together in a mixing tee arrangement and introduced below the reactor bed into the recycle gas line. The individual flow rates of ethylene, hydrogen, and comonomer are controlled to maintain fixed composition targets. The comonomer is also controlled to maintain a constant comonomer to ethylene mole ratio. The ethylene concentration is controlled to maintain a constant ethylene partial pressure. The hydrogen is controlled to maintain a constant hydrogen to ethylene mole ratio. The concentrations of all the gases are measured by an on-line gas chromatograph to ensure relatively constant composition in the recycle gas stream. Isopentane is also feed to the reactor.

The reaction bed of growing polymer particles within the reactor is maintained in a fluidized state by the continuous flow of a make-up feed and recycle gas through the reaction zone. To maintain the fluidized state within the reactor the superficial gas velocity is kept from 0.6 m/s to 0.8 m/s. The reactor is operated at a total pressure of 2,170 kPa and the reactor temperature is adjusted based depending on desired product. During transition periods the superficial gas velocity may be reduced, e.g., to about 0.5 m/s to control fines. The velocity may be returned to an appropriate level for the new polymerization conditions after the transition period. Superficial gas velocity may be reduced to mitigate entrainment issues and/or plate fouling. Adjusting the superficial gas velocity may be important where the amount of fines made under a first set of polymerization conditions and a first catalyst composition is significantly higher than that made under the subsequent polymerization conditions and catalyst compositions. Entrainment static is known to indicate entrainment/fouling issues. Thus, appropriate superficial gas velocities may be selected by monitoring the entrainment static as is known in the art.

The mixed catalyst system is mixed with carrier fluids (isopentane and nitrogen) to provide a catalyst slurry and injected directly into the reactor by using nozzle having a tube in a tube assembly that is disposed inside a support tube and the tip of the tube in a tube assembly extended past the end of the support tube by 6 mm to 26 mm. The outer diameter of the catalyst tube assembly is 6.35 mm. The support tube is a pipe inserted inside the reactor that had a hole bored with a diameter of 15.875 mm. The rate of the catalyst slurry introduced to the reactor is adjusted to maintain a constant production rate of polymer. In the annular space between the outside of the catalyst tube and the inside of the support tube, a flow of gas "fluid" is used to help disperse the catalyst into the reactor and to keep the tip of the catalyst tube clean to prevent formation of agglomerates. The feed is recycle or "cycle" gas recovered from the top of the reactor and contained primarily ethylene along with hydrogen, comonomer, and isopentane. The feed is introduced at a rate of about 1,000 kg/hr. It may be beneficial particularly in commercial processes to use fresh ethylene rather than a side stream cycle gas.

The fluidized bed is maintained at a height at about 4 meters by withdrawing a portion of the bed at a rate equal to the rate of formation of particulate product. The rate of product formation (the polymer production rate) is in the range of 45 to 90 kg/hour. The product is removed semi-continuously via a series of valves into a fixed volume chamber, which is simultaneously vented back to the reactor, which provided an efficient removal of the product while at the same time recycled a large portion of the un-reacted gases back to the reactor. The recovered product is purged to remove entrained and dissolved hydrocarbons and treated with a small steam of humidified nitrogen to deactivate any trace quantities of residual catalyst. To maintain a constant reactor temperature, the temperature of the recycle gas entering the reactor is adjusted, i.e., heated or cooled as necessary, to accommodate any changes in the rate of heat generation due to the polymerization.

Example 1

Example 1 demonstrates a transition from making a first polyethylene composition having a density of 0.953 g/cm³ and a melt index, $I_{2.16}$, of about 40 g/10 min., and a Flow Index, $I_{21}$, <1 g/10 min. produced with a unimodal hafnocene catalyst composition comprising bis(n-propylcyclopentadienyl)hafnium dichloride. In the transition, the flow of the unimodal hafnium catalyst composition to the reactor is terminated and residual reaction is allowed to proceed for about 4 hours. Feed of a continuity additive is maintained at about 30 ppm during this time. Thereafter, the concentration of the continuity additive is increased to between 40 and 50 ppmw (based on the weight of the polymer and additive in the reactor), a typical concentration for the bimodal catalyst composition. The reactor gas composition is adjusted to make a polyethylene having a density of 0.948-0.950 g/cm³, a Flow Index, $I_{21}$, of about 6.0 g/10 min., and an $I_5$ of about 0.2 g/10 min. in the presence of the bimodal catalyst composition comprising ((Me₄Cp)(n-pr-Cp)ZrMe₂), as a solution trim catalyst in conjunction with a mixture of a non-metallocene catalyst ([(2,3,4,5,6-Me₅C₆)NCH₂CH₂]₂NHZrBz₂, where Bz is a benzyl group), and a second metallocene catalyst, ((Me₄Cp)(n-pr-Cp)ZrCl₂). The transition was successful. The flow of the second catalyst composition to the reactor is then initiated. When a desirable production rate is observed, the continuity additive is again introduced.

A smooth transition from the first polyethylene composition to the second polyethylene composition is observed.

Figure 2:
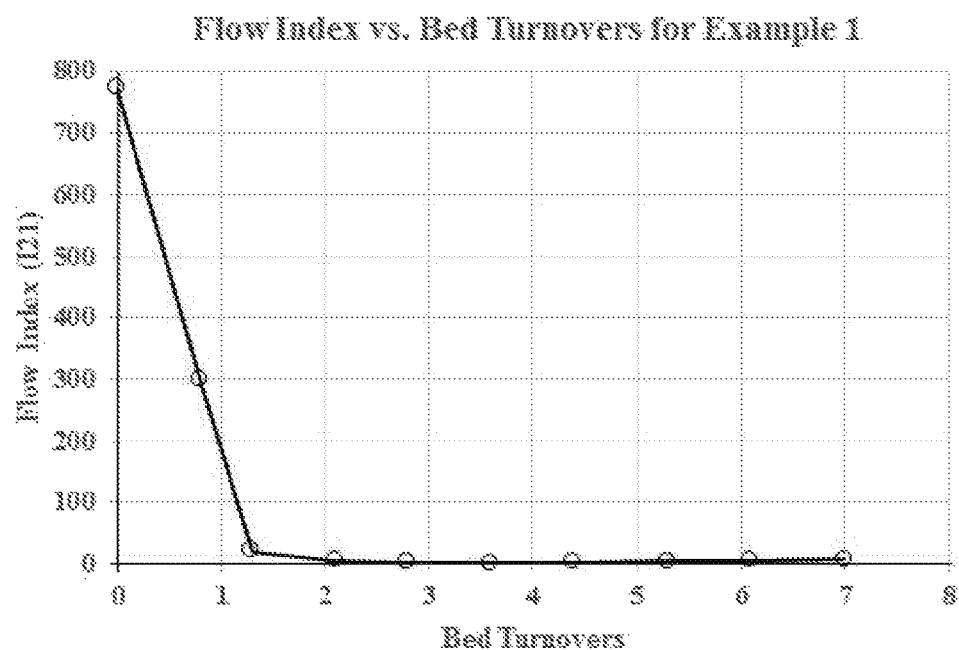
FIG. 2 graphically illustrates the change is Flow Index along the reaction coordinate, measured in bed turnovers.

Table I shows the change in flow index as the transition from the first polyolefin composition made with the unimodal hafnocene catalyst complex to the second polyolefin composition made with the bimodal catalyst composition occurs. The Flow Index surprisingly decreased very quickly and the target Flow Index was achieved for the second polyethylene composition at about 2 bed turnovers. The data in Table I is graphically depicted in FIG. 2.

TABLE I

| Bed Turnovers | 0.0 | 0.8 | 1.3 | 2.1 | 2.8 | 3.6 | 4.8 | 5.3 | 6.1 | 7.0 |
|---|---|---|---|---|---|---|---|---|---|---|
| Flow Index g/10 min. | 773.62 | 300.54 | 20.52 | 6.17 | 2.81 | 1.68 | 2.09 | 3.56 | 5.41 | 6.98 |

Example 2

Example 1 is substantially reproduced except that the process is performed in reverse order. Thus, the first polyethylene composition comprises the bimodal composition having a density of 0.948-0.950 g/cm³, a Flow Index, $I_{21}$, of about 6.0 g/10 min., and an $I_5$ of about 0.2 g/10 min. is made in the presence of the bimodal catalyst composition described above. The flow of the bimodal catalyst and trim is terminated and residual reaction is allowed to proceed for about 4 hours. The flow of continuity additive is maintained for 30 minutes after stopping catalyst and trim. After 30 minutes the flow of the continuity additive is also terminated. After one hour, the reactor gas composition is adjusted to provide 100 lb/hr of ethylene, 0.5 lb/hr of hexane, 6 milli-lb/hr of hydrogen and 5 lb/hr of nitrogen to make a polyethylene having a density of 0.953 g/cm³ and a melt index, $I_{2.16}$, of about 40 g/10 min., and a Flow Index, $I_{21}$, <1 g/10 min. in the presence of the unimodal hafnocene catalyst composition comprising bis(n-propylcyclopentadienyl)hafnium dichloride. The reactor temperature is reduced to 90.6° C. (195° F.). The gas flows are maintained. Target concentrations are 64 mol % ethylene, 565 ppm hydrogen, and 0.16 mol % hexene. The flow of the unimodal hafnocene catalyst is initiated and the velocity is maintained at about 0.60 m/sec. (1.95 ft/sec) until about 4 bed turnovers. After 4 bed turnovers, the velocity is increased to 0.64 m/sec (2.10 ft/sec) over two hours. The final bed weight is about 615 lbs. Continuity additive flow is maintained at about 1 cm³/hr until a production rate of 50 lb/hr is reached. Thereafter, the flow of the continuity additive slurry is increased to about 11.5 cm³/hr for a production rate of about 150 lb/hr. A smooth transition from the bimodal catalyst composition to the unimodal catalyst composition is observed. Production of the unimodal polyethylene continues for many bed turnovers without significant process upsets.

Particular Embodiments

Embodiment 1. A method for olefin polymerization, comprising: a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; and b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; with the proviso that the process is essentially free of providing a polymerization neutralizing composition between steps a) and b).

Embodiment 2. Embodiment 1, wherein the first and second continuity additive compositions each comprise aluminum distearate, zinc distearate, or mixtures thereof.

Embodiment 3. Embodiment 1 or 2, wherein the first and second continuity additive compositions are essentially the same and the method further comprises adjusting the first concentration to the second concentration.

Embodiment 4. Any of Embodiments 1 to 3, wherein the first catalyst composition comprises a bimodal catalyst composition and the second catalyst composition comprises a unimodal catalyst composition.

Embodiment 5. Any of Embodiments 1 to 4, wherein the first catalyst composition comprises a unimodal catalyst composition and the second catalyst composition comprises a bimodal catalyst composition.

Embodiment 6. Any of Embodiments 1 to 5, further comprising:
c) forming a third polyolefin composition under a third set of polymerization conditions in the presence of the first catalyst composition and a third concentration of the third continuity additive composition, the third polyolefin composition having a target density, $\rho_3$, and target Flow Index, $FI_3$.

Embodiment 7. Any of Embodiments 1 to 6, wherein the third catalyst composition comprises a bimodal catalyst composition.

Embodiment 8. Any embodiment within the scope of Embodiments 6 and 7, wherein the third catalyst composition comprises a unimodal catalyst composition.

Embodiment 9. Any embodiment within the scope of Embodiments 6 to 8, wherein the second and third continuity additive compositions each comprise aluminum distearate, zinc distearate, or mixtures thereof.

Embodiment 10. Any of Embodiments 1 to 9, wherein the first and second continuity additive compositions are essentially the same and the method further comprises adjusting the first concentration to the second concentration.

Embodiment 11. Any embodiment within the scope of Embodiments 6 to 10, wherein the difference between the densities of the first and third polyolefin compositions is ≤0.005 g/cm³.

Embodiment 12. Any embodiment within the scope of Embodiments 6 to 11, wherein the difference between the Flow Indexes, $I_{21}$, of the first and third polyolefin compositions is ≤1.0 g/10 min.

Embodiment 13. Any of Embodiments 1 to 12, wherein the target density, $\rho_1$, is 0.870 g/cm³ to about 0.970 g/cm³, particularly about 0.945 to about 0.965 g/cm³, and the target density, $\rho_2$, is about 0.870 g/cm³ to about 0.970 g/cm³, particularly about 0.945 to about 0.965 g/cm³, and wherein the difference between the target densities of the first and second polyolefin compositions is ≤0.005 g/cm³.

Embodiment 14. Any of Embodiments 1 to 13, wherein the target Flow Index, $FI_1$, is about 1.0 to about 1000.0 g/10 min., particularly about 600 to about 800 g/10 min. or ≤about 1 g/10 min., and the target Flow Index, $FI_2$, is about 1.0 to about 1000.0 g/10 min., particularly about 600 to about 800 g/10 min. or ≤about 1 g/10 min., wherein the difference in the target Flow Indexes of the first and second polyolefin compositions is ≥about 100.0 g/10 min., particularly, ≥about 200.0 g/10 min., ≥about 300.0 g/10 min., ≥about 500.0 g/10 min., or ≥about 700.0 g/10 min.

Embodiment 15. Any of Embodiments 1 to 14, wherein the first catalyst composition comprises at least a first metallocene catalyst.

Embodiment 16. Any embodiment within the scope of Embodiment 15, wherein the first metallocene catalyst is selected from the group consisting of [(2,4,6-Me$_3$C$_6$H$_2$)NCH$_2$CH$_2$]$_2$NHHfBz$_2$, [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group and bis(n-propylcyclopentadienyl)hafnium dichloride.

Embodiment 17. Any embodiment within the scope of Embodiment 16, wherein the first catalyst composition further includes at least a second metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

Embodiment 18. Any of Embodiments 1 to 17, wherein the second catalyst composition comprises at least a first metallocene catalyst.

Embodiment 19. Any embodiment within the scope of Embodiment 18, wherein the second metallocene catalyst is selected from the group consisting of [(2,4,6-Me$_3$C$_6$H$_2$)NCH$_2$CH$_2$]$_2$NHHfBz$_2$ or [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group selected from the group consisting of [(2,4,6-Me$_3$C$_6$H$_2$)NCH$_2$CH$_2$]$_2$NHHfBz$_2$, [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group and wherein the first catalyst composition further includes at least a second metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

Embodiment 20. Any embodiment within the scope of Embodiment 18 and 19, wherein the second catalyst composition further includes at least a second metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

Embodiment 21. Any of Embodiments 1 to 20, wherein the target density, $\rho_2$, and the target Flow Index, $FI_2$, are reached after a first transition period comprising ≤5.0 bed turnovers.

Embodiment 22. Any of Embodiments 1 to 21, further including adjusting the superficial gas velocity during a transition period from the first set of polymerization conditions to the second set of polymerization conditions.

Embodiment 23. Any embodiment within the scope of Embodiment 22, wherein adjusting the superficial gas velocity includes reducing the superficial gas velocity during the transition period.

Embodiment 24. A method for olefin polymerization, comprising: a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; and b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; with the proviso that the process is essentially free of providing a polymerization neutralizing composition between steps a) and b); wherein the difference between the target densities of the first and second polyolefin compositions is ≤0.005 g/cm³; wherein the difference in the target flow indexes of the first and second polyolefin compositions is ≥about 10.0 g/10 min.; wherein the target density, $\rho_2$, and the target Flow Index, $FI_2$, are reached after a first transition period comprising ≤5.0 bed turnovers.

Embodiment 25. Embodiment 25, wherein the first catalyst composition comprises at least a first metallocene catalyst.

Embodiment 26. Any embodiment within the scope of Embodiment 25, wherein the first metallocene catalyst is selected from the group consisting of [(2,4,6-Me$_3$C$_6$H$_2$)NCH$_2$CH$_2$]$_2$NHHfBz$_2$, [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group and bis(n-propylcyclopentadienyl)hafnium dichloride.

Embodiment 27. Any embodiment within the scope of Embodiments 25 and 26, wherein the first catalyst composition further includes at least a second metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

Embodiment 28. Any of Embodiments 24 to 29, wherein the second catalyst composition comprises at least a first metallocene catalyst.

Embodiment 29. Any embodiment within the scope of Embodiment 28, wherein the first metallocene catalyst of the second catalyst composition is selected from the group consisting of [(2,4,6-Me$_3$C$_6$H$_2$)NCH$_2$CH$_2$]$_2$NHHfBz$_2$ or [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group selected from the group consisting of [(2,4,6-Me$_3$C$_6$H$_2$)NCH$_2$CH$_2$]$_2$NHHfBz$_2$, [(2,4,6-Me$_3$C$_6$H$_2$)NCH$_2$CH$_2$]$_2$NHZrBz$_2$ or [(2,3,4,5,6-Me$_5$C$_6$)NCH$_2$CH$_2$]$_2$NHZrBz$_2$, where Bz is a benzyl group and bis(n-propylcyclopentadienyl)hafnium dichloride.

Embodiment 30. The method of claim 21, wherein the second catalyst composition further includes at least a second metallocene catalyst selected from the group consisting of bis(indenyl)zirconium dichloride, (pentamethylcyclopentadienyl)(n-propylcyclopentadienyl)zirconium dichloride, or (tetramethylcyclopentadienyl)(n-propylcyclopentadienyl)zirconium dichloride.

Embodiment 31. The method of claim 1, further comprising: c) forming a third polyolefin composition under a third set of polymerization conditions in the presence of the first catalyst composition and the third concentration of the second continuity additive, the third polyolefin composition having a target density, $\rho_3$, and target Flow Index, $FI_3$.

Embodiment 32. Embodiment 31, wherein the target density, $\rho_3$, and the target Flow Index, $FI_3$, are reached after a second transition period comprising ≤5.0 bed turnovers, particularly ≤4.0 bed turnovers, ≤3.0 bed turnovers, ≤2.0 bed turnovers, ≤1.0 bed turnovers.

Embodiment 33. A method for olefin polymerization, comprising: a) forming a first polyolefin under a first set of polymerization conditions in the presence of a first catalyst composition and a first concentration of at least a first continuity additive composition, the first polyolefin composition having a target density, $\rho_1$, and a target Flow Index, $FI_1$; b) forming a second polyolefin composition under a second set of polymerization conditions in the presence of a second catalyst composition and a second concentration of a second continuity additive composition, the second polyolefin composition having a target density, $\rho_2$, and a target Flow Index, $FI_2$; and c) forming a third polyolefin composition under a third set of polymerization conditions in the presence of the first catalyst composition and a third concentration of a third continuity additive, the third polyolefin composition having a target density, $\rho_3$, and target Flow Index, $FI_3$; with the provisos that i) the process is essentially free of providing a polymerization neutralizing composition between steps a) and b) and ii) the process is essentially free of providing a polymerization neutralizing composition between steps b) and c) wherein the difference between the first and third target densities is ≤0.005 g/cm³; wherein the difference between the first and third target Flow Indexes is <1.0 g/10 min.; wherein the difference between the first and second target densities is ≤0.005 g/cm³; wherein the difference between the first and second target Flow Indexes is ≤10.0 g/10 min.; wherein the target density, $\rho_2$, and the target Flow Index, $FI_2$, are reached after a first transition period comprising ≤5.0 bed turnovers and wherein the target density, $\rho_3$, and the target Flow Index, $FI_3$, are reached after a second transition period comprising ≤5.0 bed turnovers thereafter.

Embodiment 34. Embodiment 33, wherein the first and third catalyst compositions comprise a bimodal catalyst composition comprising ((Me$_4$Cp)(n-pr-Cp)ZrMe$_2$), as a solution trim catalyst in conjunction with a mixture of a non-metallocene catalyst ([(2,3,4,5,6-Me$_5$C$_6$)NCH$_2$CH$_2$]$_2$NHZrBz$_2$, where Bz is a benzyl group), and a second metallocene catalyst, ((Me$_4$Cp)(n-pr-Cp)ZrCl$_2$, wherein the second catalyst composition comprises bis(n-propylcyclopentadienyl)hafnium dichloride.

Embodiment 35. Embodiment 33 or 34 wherein the target density, $\rho_1$, is 0.940-0.960 g/cm³, particularly 0.945-0.955 g/cm³, the target Flow Index, $FI_1$, is about 4.0 to 8.0 g/10 min., particularly about 5.0 to about 7.0 g/10 min, more particularly about 6.0 g/10 min.; the target density, $\rho_2$, is 0.940-0.960 g/cm³, particularly 0.945-0.955 g/cm³, the target Flow Index, $FI_2$, is about ≤1.0 g/10 min., ≤0.5 g/10 min., more particularly ≤0.1 g/10 min.; the target density, $\rho_3$, is 0.940-0.960 g/cm³, particularly 0.945-0.955 g/cm³, the target Flow Index, $FI_3$, is about 4.0 to 8.0 g/10 min., particularly about 5.0 to about 7.0 g/10 min, more particularly about 6.0 g/10 min.

Embodiment 36. Embodiment 33 wherein the first and third catalyst compositions comprise bis(n-propylcyclopentadienyl)hafnium dichloride, and the second composition comprises a bimodal catalyst composition comprising ((Me$_4$Cp)(n-pr-Cp)ZrMe$_2$), as a solution trim catalyst in conjunction with a mixture of a non-metallocene catalyst ([(2,3,4,5,6-Me$_5$C$_6$)NCH$_2$CH$_2$]$_2$NHZrBz$_2$, where Bz is a benzyl group), and a second metallocene catalyst, ((Me$_4$Cp)(n-pr-Cp)ZrCl$_2$, wherein the second catalyst composition comprises bis(n-propylcyclopentadienyl)hafnium dichloride.

Embodiment 37. Embodiment 33 or 36, wherein the target density $\rho_1$, is 0.940-0.960 g/cm³, particularly 0.945-0.955 g/cm³, the target Flow Index, $FI_1$, is ≤1.0 g/10 min., ≤0.5 g/10 min, more particularly ≤0.1 g/10 min.; the target density, $\rho_2$, is 0.940-0.960 g/cm³, particularly 0.945-0.955 g/cm³, the target Flow Index, $FI_2$, is about 4.0 to 8.0 g/10 min., particularly about 5.0 to about 7.0 g/10 min, more particularly about 6.0 g/10 min.; the target density $\rho_3$, is 0.940-0.960 g/cm$^3$, particularly 0.945-0.955 g/cm$^3$, and the target Flow Index, FI$_3$, is ≤1.0 g/10 min., ≤0.5 g/10 min., more particularly ≤0.1 g/10 min.

All documents cited herein are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for olefin polymerization, comprising:
   a) forming a first polyolefin under a first set of polymerization conditions in the presence of a first catalyst composition and a first concentration of at least a first continuity additive composition, the first polyolefin composition having a target density, pi, and a target Flow Index, FI$_1$; and
   b) forming a second polyolefin composition under a second set of polymerization conditions in the presence of a second catalyst composition and a second concentration of a second continuity additive composition, the second polyolefin composition having a target density, $\rho_2$, and a target Flow Index, FI$_2$;
   wherein the process is essentially free of providing a polymerization neutralizing composition between steps a) and b);
   wherein the difference between the target densities of the first and second polyolefin compositions is ≤0.005 g/cm$^3$;
   wherein the difference in the target flow indexes of the first and second polyolefin compositions is ≥about 10.0 g/10 min.; and
   wherein the target density, $\rho_2$, and the target Flow Index, FI$_2$, are reached after a first transition period comprising ≤5.0 bed turnovers.

2. The method of claim 1, wherein the first catalyst composition comprises at least a first metallocene catalyst.

3. The method of claim 1, wherein the first metallocene catalyst composition is selected from the group consisting of [(2,4,6-Me$_3$C$_6$H$_2$)NCH$_2$CH$_2$]$_2$NHHfBz$_2$, [(2,4,6-Me$_3$C$_6$H$_2$) NCH$_2$CH$_2$]$_2$NHZrBz$_2$ or [(2,3,4,5,6-Me$_5$C$_6$)NCH$_2$CH$_2$]$_2$ NHZrBz$_2$, where Bz is a benzyl group, and a first metallocene catalyst bis(n-propylcyclopentadienyl)hafnium dichloride.

4. The method of claim 3, wherein the first catalyst composition further includes at least a second metallocene catalyst selected from the group consisting of bis(indenyl) zirconium dichloride, (pentamethylcyclopentadienyl)(n-propylcyclopentadienyl)zirconium dichloride, or (tetramethylcyclopentadienyl)(n-propylcyclopentadienyl) zirconium dichloride.

5. The method of claim 1, wherein the second catalyst composition comprises at least a first metallocene catalyst.

6. The method of claim 1, wherein the second catalyst composition is selected from the group consisting of [(2,4, 6-Me$_3$C$_6$H$_2$)NCH$_2$CH$_2$]$_2$NHHfBz$_2$ or [(2,4,6-Me$_3$C$_6$H$_2$) NCH$_2$CH$_2$]$_2$NHZrBz$_2$ or [(2,3,4,5,6-Me$_5$C$_6$)NCH$_2$CH$_2$]$_2$ NHZrBz$_2$, where Bz is a benzyl group and a first metallocene catalyst bis(n-propylcyclopentadienyl)hafnium dichloride.

7. The method of claim 6, wherein the second catalyst composition further includes at least a second metallocene catalyst selected from the group consisting of bis(indenyl) zirconium dichloride, (pentamethylcyclopentadienyl)(n-propylcyclopentadienyl)zirconium dichloride, or (tetramethylcyclopentadienyl)(n-propylcyclopentadienyl) zirconium dichloride.

8. The method of claim 1, further comprising:
   c) forming a third polyolefin composition under a third set of polymerization conditions in the presence of the first catalyst composition and a third concentration of a third continuity additive, the third polyolefin composition having a target density, $\rho_3$, and target Flow Index, FI$_3$.

9. The method of claim 8, wherein the target density, $\rho_3$, and the target Flow Index, FI$_3$, are reached after a second transition period comprising ≤5.0 bed turnovers.

10. A method for olefin polymerization, comprising:
   a) forming a first polyolefin under a first set of polymerization conditions in the presence of a first catalyst composition and a first concentration of at least a first continuity additive composition, the first polyolefin composition having a target density, $\rho_1$, and a target Flow Index, FI$_1$;
   b) forming a second polyolefin composition under a second set of polymerization conditions in the presence of a second catalyst composition and a second concentration of a second continuity additive composition, the second polyolefin composition having a target density, $\rho_2$, and a target Flow Index, FI$_2$; and
   c) forming a third polyolefin composition under a third set of polymerization conditions in the presence of the first catalyst composition and a third concentration of the third continuity additive, the third polyolefin composition having a target density, $\rho_3$, and target Flow Index, FI$_3$;
   with the provisos that i) the process is essentially free of providing a polymerization neutralizing composition between steps a) and b) and ii) the process is essentially free of providing a polymerization neutralizing composition between steps b) and c),
   wherein the difference between the first and third target densities is ≤0.005 g/cm$^3$;
   wherein the difference between the first and third target Flow Indexes is ≤1.0 g/10 min.;
   wherein the difference between the first and second target densities is ≤0.005 g/cm$^3$;
   wherein the difference between the first and second target Flow Indexes is ≥10.0 g/10 min.;
   wherein the target density, $\rho_2$, and the target Flow Index, FI$_2$, are reached after a first transition period comprising ≤5.0 bed turnovers and wherein the target density, $\rho_3$, and the target Flow Index, FI$_3$, are reached after a second transition period comprising ≤5.0 bed turnovers thereafter.

* * * * *